US012708912B2

(12) United States Patent
Solomon

(10) Patent No.: US 12,708,912 B2
(45) Date of Patent: Aug. 18, 2026

(54) HIGH-FREQUENCY PULSED CO-AXIAL INJECTOR SYSTEM AND METHOD FOR HIGH-SPEED FLOW MIXING AND CONTROL

(71) Applicant: Tuskegee University, Tuskegee, AL (US)

(72) Inventor: John Solomon, Tuskegee, AL (US)

(73) Assignee: Tuskegee University, Tuskegee, AL (US)

(*) Notice: Subject to any disclaimer, the term of this patent is extended or adjusted under 35 U.S.C. 154(b) by 727 days.

(21) Appl. No.: 18/102,122

(22) Filed: Jan. 27, 2023

(65) Prior Publication Data

US 2023/0415173 A1 Dec. 28, 2023

Related U.S. Application Data

(60) Provisional application No. 63/354,751, filed on Jun. 23, 2022.

(51) Int. Cl.
*B05B 1/08* (2006.01)
*B05B 7/04* (2006.01)

(52) U.S. Cl.
CPC .............. *B05B 1/08* (2013.01); *B05B 7/0425* (2013.01)

(58) Field of Classification Search
CPC ....... B05B 1/08; B05B 7/0425; B01F 25/314; F05D 2260/16; F05D 2260/601; F02K 9/52; F02K 7/02
See application file for complete search history.

(56) References Cited

U.S. PATENT DOCUMENTS

2019/0211777 A1* 7/2019 Solomon ................... F02K 7/02
2021/0069733 A1* 3/2021 Schmidt .................... F04F 5/46

OTHER PUBLICATIONS

Solomon, John T. et al., "High-Frequency Pulsed Coaxial Injectors for High-Speed Flow Mixing and Control," AAIA Journal, Aug. 27, 2023. Retrieved by https://doi.org/10.2514/1.J062369.
B. Ritchie, D. Mujumdar, and J. Seitzman, "Mixing in co-axial jets using synthetic jet actuators," AIAA-2000-04-04.
Davis, S. A. & Gezer, A., "Mixing Control of Fuel Jets Using Synthetic Jet Technology: Velocity Field Measurements," AIAA Paper 99-0447.

(Continued)

*Primary Examiner* — Qingzhang Zhou
(74) *Attorney, Agent, or Firm* — Terry M. Sanks, Esq.; Beusse Sanks, PLLC

(57) ABSTRACT

The injection system includes a Resonance Enhanced Microjet nozzle assembly. The assembly includes plates including top and bottom plates, a first inlet in the top plate and coupled to steady jet. The bottom plate includes a hollow cavity having a bottom surface. A tube within the bottom plate forms a first outlet that exits a supersonic pulsed actuation jet in the range of kHz from the bottom plate. A second outlet is in the bottom plate and positioned concentric about the tube to form a circular slit. The circular slit is directly coupled to the bottom surface of the cavity. A second inlet via a conduit is coupled to a secondary fluid stream and the cavity. The system significantly improves the mixing of an actuation jet with the steady stream injected up to 115% in comparison to a system that uses a steady actuation jet under same operating pressure.

22 Claims, 31 Drawing Sheets
(20 of 31 Drawing Sheet(s) Filed in Color)

(56) References Cited

OTHER PUBLICATIONS

Broadwell, J. E. and Mungal, M. G., "Large Scale Structures and Molecular Mixing," Physics Fluids, 1193-1206, 1991.
Kraus, D. K., and Cutler, A. D., "Mixing of Swirling Jets in a Supersonic Duct Flow," Journal of Propulsion and Power, vol. 12, No. 1, 1995, pp. 170-177. doi:10.2514/3.24007.
Cutler, A. D., and Doerner, S. E., "Effects of Swirl and Skew upon Supersonic Wall Jet in Crossflow," Journal of Propulsion and Power, vol. 17, No. 6, 2001, pp. 1327-1332. doi:10.2514/2.5882.
Drozda, T. G., Baurle, R. A., and Drummond, J. P., "Impact of Flight Enthalpy, Fuel Stimulant, and Chemical Reactions on the Mixing Characteristics of Several Injectors at Hypervelocity Flow Conditions," NASA Langley Research Center, May 2016, https://ntrs.nasa.gov/ archive/nasa/casi.ntrs.nasa.gov/20160009131.pdf [retrieved May 2017].
Gruber, M. R., Nejad, A. S., Chen, T. H., and Dutton, J. C., "Transverse Injection from Circular and Elliptic Nozzles into a Supersonic Crossflow," Journal of Propulsion and Power, vol. 16, No. 3, 2000, pp. 449-457. doi:10.2514/2.5609.
VanLerberghe, W. M., Santiago, J. G., Dutton, J. C., and Lucht, R. P., "Mixing of a Sonic Transverse Jet Injected into a Supersonic Flow," AIAA Journal, vol. 38, No. 3, 2000, pp. 470-479. doi:10.2514/2.984.
Shigeru, A., ArifNur, H., Shingo, M., Kei, I., and Yasuhiro, T., "Fundamental Study of Supersonic Combustion in Pure Air Flow with Use of Shock Tunnel," Acta Astronautica, vol. 57, Nos. 2-8, 2005, pp. 384-389. doi:10.1016/j.actaastro.2005.03.055.
Menon, S., "Shock Wave Induced Mixing Enhancement in Scramjet Combustors," AIAA Paper 1989-0104, 1989. doi:10.2514/6.1989-104.
Ben-Yakar, B., Mungal, M. G., and Hanson, R. K., "Time Evolution and Mixing Characteristics of Hydrogen and Ethylene Supersonic Crossflow," Physics of Fluids, vol. 18, No. 2, 2006, Paper 026101. doi:10.1063/1.2139684.
Hsu, K., Carter, C. D., Gruber, M. R., and Tam, C., "Mixing Study of Strut Injectors in Supersonic Flows," AIAA Joint Propulsion Conference, AIAA Paper 2009-5226, 2009. doi:10.2514/6.2009-5226.
Hongbin, G., Zhi, L., Fei, L., Lihong, C., Shenglong, G., and Xinyu, C., "Characteristics of Supersonic Combustion with Hartmann-Sprenger Tube Aided Fuel Injection," AIAA Conference, AIAA Paper 2011-2326, 2011. doi:10.2514/6.2011-2326.
Solomon, J. T., Cairnes, K., Nayak, C., Jones, M. and Alexander, D. Design and Characterization of Nozzle Injection Assemblies Integrated High-frequency Microactuators. AIAA Journal vol. 56, No. 9, pp. 3436-3448, 2018.
Ali MY, Arora N, Topolski M, Alvi FS, and Solomon JT. Properties of Resonance Enhanced Microjets in Supersonic Crossflow AIAA Journal, AIAA Journal, vol. 55, No. 3, pp. 1075-1081. https://doi.org/10.2514/1.J055082, 2017.
Uzun, A., Solomon, J.T., Foster, C.H., Oates, W.S., Hussaini, M.Y., Alvi, F.S. Flow physics of a pulsed microjet actuator for high-speed flow control. AIAA Journal vol. 51, No. 12, pp. 2894-2918, 2013.
Solomon, J. T., Foster, C., Alvi F.S. Design, and characterization of High-Bandwidth, Resonance Enhanced, Pulsed Microactuators: a parametric study. AIAA Journal, vol. 51, No. 2, pp. 386-396, 2013.
Solomon, J. T., Kumar, R., and Alvi, F.S. High-Bandwidth Pulsed Microactuators for High-Speed Flow Control, AIAA Journal, vol. 48, No. 10, pp. 2386-2396. doi.org/10.2514/1.J050405, 2010.
Solomon, J, T. High-bandwidth Unsteady Actuators for Active Control of High-Speed Flows, Ph.D. Dissertation, Florida State University. http://purl.flvc.org/fsu/fd/FSU_migr_etd-1642, 2010.
Lozano, A., Smith, S. H., Mungal, M. G. and Hanson, R. K., "Concentration Measurements in a Transverse Jet by Planar Laser-Induced Fluorescence of Acetone" AIAA Journal 32, 218-221, (1994).
Lozano, A., Yip, B., and Hanson, R. K., "Acetone: a by planar laser-induced fluorescence," Experiments in Fluids 13, 369-376, (1992).
Solomon, John T., Kreth, Philip A., Lockyer, Rhys & Jones, Tailor . "High-Frequency Pulsed Co-axial Injectors for High-Speed Flow Mixing and Control," AIAA 2022-3926. AIAA Aviation 2022 Forum. Jun. 2022.
Solomon, John T. et al., "High-Frequency Pulsed Coaxial Injectors for High-Speed Flow Mixing and Control," AAIA Journal 2022-3926. (Jun. 20, 2022). Retrieved by https://doi.org/10.2514/6.2022-3926.
Solomon, John T. et al. "Planar Laser-Induced Fluorescence (PLIF) Studies on a High-Frequency Pulsed Co-Axial Injector Flowfield," Proceedings of the 9th International and 49th National Conference on Fluid Mechanics and Fluid Power (FMFP), Dec. 14-16, 2022, IIT Roorkee, Roorkee-247667, Uttarakhand, India.

* cited by examiner

600b

600a 800a 800b 800c 800d 800H 800E 800F 800G

900a

900b

900c

900D

900E

900F

1300a

1300b

1300c

2500

HIGH-FREQUENCY PULSED CO-AXIAL INJECTOR SYSTEM AND METHOD FOR HIGH-SPEED FLOW MIXING AND CONTROL

CO-REFERENCE TO RELATED APPLICATIONS

This application claims priority benefit of U.S. Provisional Application No. 63/354,751, titled "HIGH-FREQUENCY PULSED CO-AXIAL INJECTOR SYSTEM AND METHOD FOR HIGH-SPEED FLOW MIXING AND CONTROL AND METHOD," filed Jun. 23, 2022, which is incorporated herein in its entirety.

STATEMENT REGARDING FEDERALLY SPONSORED RESEARCH OR DEVELOPMENT

This invention was made with government support under Grant No. 1900177 awarded by National Science Foundation. The government may have certain rights in the invention.

BACKGROUND

The embodiments relate to high-frequency, pulsed co-axial injector system and method for high-speed mixing and control.

The efficient mixing of two fast-moving fluid streams is a crucial engineering problem in high-speed combustion systems. Several aerospace applications use a co-axial jet configuration, a simple and effective mixing method in which fluids flowing separately through the inner core and the annular space meet at the exit plane of the nozzle assembly. For example, in applications like a gas turbine or combustion chamber of a rocket engine, these fluids could be oxidizers, such as gaseous or liquid oxygen, and fuel in its liquid or gaseous phase. Effective and controlled mixing can lead to higher combustion efficacy, longer life, reduced combustor size, stable operations and fewer emissions/pollutants. Although the mixing ultimately happens at the molecular level, active flow control techniques can tailor the flow dynamics at micro and macro scales in favor of rapid diffusion at the molecular level [1-3].

The microscopic convective time scale (order of milliseconds) associated with hypersonic flow systems demands effective fuel injection techniques for their efficient and stable operations. There is a need for robust flow control actuators to enhance microscale mixing at high-speed and positively alter the macroscopic phenomena involved. The entrainment and vorticity dynamics resulting from the shear layer instability modification play a significant role in the overall efficiency of the mixing process. Since the flow mixing problem and control face more challenges at extreme flow conditions, feasible solutions are critical to advancing next-generation air-breathing hypersonic flight systems at the forefront of national priorities defense. Passive methods proposed for improved mixing use flush mounted or intrusive injectors to generate streamwise, counter-rotating vortices for rapid nearfield mixing of the incoming air and fuel [4-12]. Beyond the classical passive co-axial configuration, a few studies explore active schemes such as powered resonance tubes (PRT) or Hartmann-Sprenger tubes as an option to excite the shear layer at high frequency [13]. Studies show that such active jet modulation is promising for improving penetration and high-speed mixing compared to unmodulated jets. However, the limited operational bandwidth and larger size restrict their implementation in practical systems.

BRIEF SUMMARY

The embodiments relate to high-frequency, pulsed co-axial injector system and method for high-speed mixing and control.

In one aspect, the system includes a Resonance Enhanced Microjet (REM) nozzle assembly, includes a plurality of plates including a top plate and a bottom plate, a first inlet formed in the top plate and coupled to a steady air jet from a source nozzle, the bottom plate including a hollow cavity having a bottom surface, a tube fixedly coupled within the bottom plate and within the hollow cavity to form a first outlet flush with an exit side of the bottom plate, the first inlet and the first outlet being fluid coupled together, a second outlet in the bottom plate and positioned concentric about the tube to form a circular slit around the tube, the circular slit being directly fluidly coupled to the bottom surface of the hollow cavity to produce a co-axial annular jet, and a second inlet is coupled to a fluid source via a conduit and the hollow cavity.

In an aspect, a method includes providing an injection system having a nozzle exit (first outlet) emitting a ultra-high frequency, supersonic, pulsed, actuation jet and a co-axial annular jet from the second outlet, concentrically surrounding the supersonic pulsed actuation jet, causing a first mixing of the co-axial annular jet and the supersonic pulsed actuation jet due to vortex-induced mixing, causing a second mixing, of the co-axial annular jet and the supersonic actuation jet due to shockwave-induced mixing, causing a third mixing of the co-axial annular jet and the supersonic pulsed actuation jet, which is due to growth and entrainment of a vortex downstream, and causing a fourth mixing of the co-axial annular jet and the supersonic pulsed actuation jet, which is from natural diffusion across the shear layers of the co-axial annular jet and the pulsed actuation jet.

In an aspect, a method includes providing an injection system having a nozzle exit emitting a supersonic actuation jet pulsing at a controlled frequency in the frequency range 10-20 kHz and a co-axial annular jet concentrically surrounding the supersonic actuation jet; changing the frequency of pulsing or amplitude of pulsing of the supersonic actuation jet; and controlling high-speed mixing of the co-axial jet and the supersonic actuation jet, in response to changing the frequency.

In an aspect, a method includes providing an injection system having a nozzle exit emitting a supersonic actuation jet pulsing at a frequency in the frequency range kHz and a co-axial annular jet concentrically surrounding the supersonic actuation jet, wherein the supersonic actuation jet is air and the annular stream is a fuel; and mixing the air and the co-axial annular jet stream of the fuel effectively in extreme flow conditions such as experienced for combustion in a scramjet combustor.

In an aspect, a method includes providing an injection system having a nozzle exit emitting a supersonic actuation jet pulsing at a frequency in the frequency range 10-20 kHz and a co-axial annular jet concentrically surrounding the supersonic actuation jet. The method includes rapid mixing of the supersonic actuation jet and the co-axial annular jet. The method includes rapid cooling using the supersonic actuation jet and the co-axial annular jet in response to the rapid mixing, to cool a nuclear reactor, a high-density electronic device, or a gas turbine, in a rapid manner.

Other technical features may be readily apparent to one skilled in the art from the following figures, descriptions, and claims.

BRIEF DESCRIPTION OF SEVERAL VIEWS OF THE DRAWINGS

The patent or application file contains at least one drawing executed in color. Copies of this patent or patent application publication with color drawing(s) will be provided by the Office upon request and payment of the necessary fee.

To easily identify the discussion of any particular element or act, the most significant digit or digits in a reference number will sometimes refer to the figure number in which that element is first introduced; and the following digits of a reference number refers to the element.

FIG. 3A illustrates a top view of a pulsed co-axial injector assembly in accordance with one embodiment. FIG. 3B illustrates a cross sectional front view of the pulsed co-axial injector assembly of FIG. 3A in accordance with one embodiment. FIG. 3C illustrates an end view of the pulsed co-axial injector assembly of FIG. 3A in accordance with one embodiment.

FIG. 7A illustrates a phase-locked, instantaneous image of the actuation jet at a phase of 0°/360°. FIG. 7B illustrates a phase-locked, instantaneous image of the actuation jet at a phase of 45°. FIG. 7C illustrates a phase-locked, instantaneous image of the actuation jet at a phase of 90°. FIG. 7D illustrates a phase-locked, instantaneous image of the actuation jet at a phase of 135°. FIG. 7E illustrates a phase-locked, instantaneous image of the actuation jet at a phase of 180°. FIG. 7F illustrates a phase-locked, instantaneous image of the actuation jet at a phase of 225°. FIG. 7G illustrates a phase-locked, instantaneous image of the actuation jet at a phase of 270°. FIG. 7H illustrates a phase-locked, instantaneous image of the actuation jet at a phase of 315°.

FIG. 8A illustrates a phase-locked instantaneous image of a co-axial $CO_2$ stream injected at a pressure of eight psi at phase 0°/360°. FIG. 8B illustrates a phase-locked instantaneous image of a co-axial $CO_2$ stream injected at a pressure of eight psi at phase 45°. FIG. 8C illustrates a phase-locked instantaneous image of a co-axial $CO_2$ stream injected at a pressure of eight psi at phase 90°. FIG. 8D illustrates a phase-locked instantaneous image of a co-axial $CO_2$ stream injected at a pressure of eight psi at phase 135°. FIG. 8E illustrates a phase-locked instantaneous image of a co-axial $CO_2$ stream injected at a pressure of eight psi at phase 180°. FIG. 8F illustrates a phase-locked instantaneous image of a co-axial $CO_2$ stream injected at a pressure of eight psi at phase 225°. FIG. 8G illustrates a phase-locked instantaneous image of a co-axial $CO_2$ stream injected at a pressure of eight psi at phase 270°. FIG. 8H illustrates phase-locked instantaneous image of a co-axial $CO_2$ stream injected at a pressure of eight psi at phase 315°.

FIG. 9A illustrates an instantaneous PLIF image of a seed jet alone. FIG. 9B illustrates an instantaneous PLIF image of a seed jet plus a pulsed actuation jet. FIG. 9C illustrates an instantaneous PLIF image of a seed jet plus a steady actuation jet.

FIG. 9D illustrates a magnified view of the instantaneous PLIF image of FIG. 9A. FIG. 9E illustrates a magnified view of the instantaneous PLIF image of FIG. 9B. FIG. 9F illustrates a magnified view of the instantaneous PLIF image of FIG. 9C.

FIG. 10A illustrates a PLIF image of co-axial flow at a phase of 0°/360°. FIG. 10B illustrates a PLIF image of co-axial flow at a phase of 45°. FIG. 10C illustrates a PLIF image of co-axial flow at a phase of 90°. FIG. 10D illustrates a PLIF image of co-axial flow at a phase of 135°. FIG. 10E illustrates a PLIF image of co-axial flow at a phase of 180°. FIG. 10F illustrates a PLIF image of co-axial flow at a phase of 225°. FIG. 10G illustrates a PLIF image of co-axial flow at a phase of 270°. FIG. 10H illustrates a PLIF image of co-axial flow at a phase of 315°.

FIG. 12A illustrates symmetry corrected PLIF image of co-axial flow and a micro-Schlieren image of the actuation jet at a phase angle of 45°. FIG. 12B illustrates symmetry corrected PLIF image of co-axial flow and a micro-Schlieren image of the actuation jet at a phase angle of 180°. FIG. 12C illustrates symmetry corrected PLIF image of co-axial flow and a micro-Schlieren image of the actuation jet at a phase angle of 315°.

FIG. 13A illustrates an average of 250 instantaneous PLIF images of a seeded jet alone. FIG. 13B illustrates an average of 250 instantaneous PLIF images of a seeded jet and a steady actuation jet. FIG. 13C illustrates an average of 250 instantaneous PLIF images of a seeded jet and a pulsed actuation jet at 15.5 kHz.

FIG. 14A illustrates a graphical representation of normalized intensity of a pixel based on the pixel location along the y direction in the image at x/d=1. FIG. 14B illustrates a graphical representation of normalized intensity of a pixel based on the pixel location along the y direction in the image at x/d=2. FIG. 14C illustrates a graphical representation of normalized intensity of a pixel based on the pixel location along the y direction in the image at x/d=3. FIG. 14D illustrates a graphical representation of normalized intensity of a pixel based on the pixel location along the y direction in the image at x/d=4. FIG. 14E illustrates a graphical representation of normalized intensity of a pixel based on the pixel location along the y direction in the image at x/d=5. FIG. 14F illustrates a graphical representation of normalized intensity of a pixel based on the pixel location along the y direction in the image at x/d=6. FIG. 14G illustrates a graphical representation of normalized intensity of a pixel based on the pixel location along a y direction in the image at x/d=7. FIG. 14H illustrates a graphical representation of normalized intensity of a pixel based on the pixel location along the y direction in the image at x/d=8.

FIG. 15A illustrates graphical representations of normalized intensity profiles of averaged images of a seed jet in streamwise direction at top, bottom and center locations. FIG. 15B illustrates graphical representations of normalized intensity profiles of averaged images of a seed jet in streamwise direction at top, center and bottom shear layer locations.

FIG. 16A illustrates graphical representations of normalized intensity profiles of averaged images of a pulsed jet in streamwise direction at top, bottom and center locations. FIG. 16B illustrates graphical representations of normalized intensity profiles of averaged images of a pulsed jet in streamwise direction at top, center and bottom shear layer locations.

FIG. 17A illustrates a graphical representation of normalized intensity profiles of averaged images of a steady jet in streamwise direction at top, bottom and center locations. FIG. 17B illustrates a graphical representation of normalized intensity profiles of averaged images of a steady jet in streamwise direction at top, cente, and bottom shear layer locations.

DETAILED DESCRIPTION

Figure 1A:
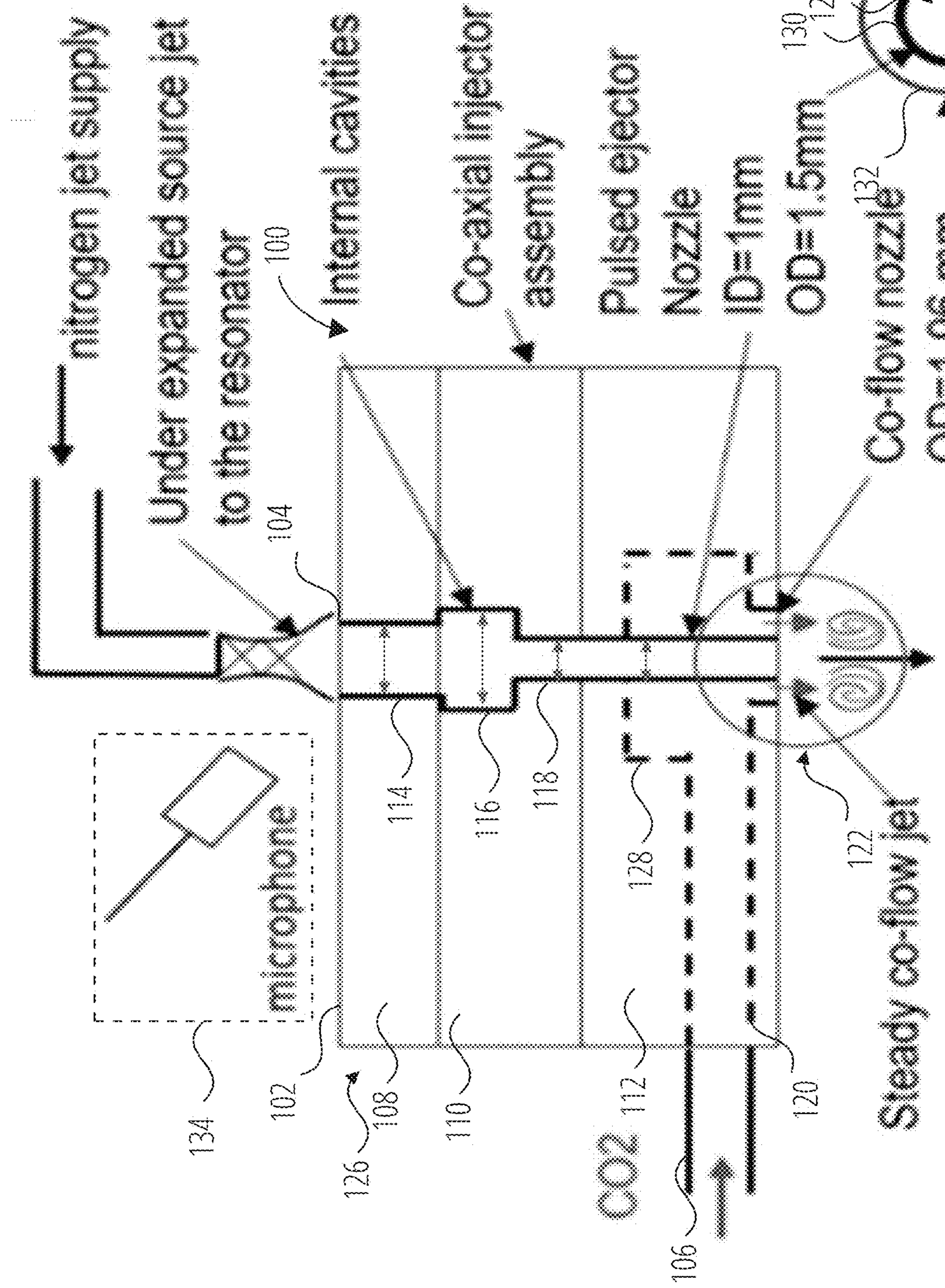
FIG. 1A illustrates an active co-axial injector system in accordance with one embodiment.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Efficient and controlled mixing of fuel with fast-moving air is a challenging physical problem relevant to hypersonic systems. Although mixing happens at the molecular level through diffusion, the macroscopic phenomena such as entrainment and vorticity dynamics resulting from the shear layer instabilities of the mixing fluids play a significant role in the overall efficiency of the process. With a focus on improving mixing at extreme flow conditions, the embodiments herein provide a high-speed, pulsed co-flow system integrated with ultra-high frequency actuators (11-20 kHz). This injection system includes a supersonic actuation air jet at the inner core that provides large mean and fluctuating velocity profiles in the shear layers of a fluid stream injector surrounding the core through an annular nozzle, with pulsing occurring at a designated ultra-high frequency. The high-frequency streamwise vortices and shockwaves tailored to the mean flow significantly enhanced supersonic flow mixing between the fluids compared to a steady co-axial configuration operating at the same input pressure. Experiments described below also indicate a strong connection between the frequency and unsteady amplitude of the actuation jet to the supersonic flow mixing phenomena.

A scramjet engine has a very complex flow field. The incoming flow is supersonic and is subjected to multiple shock terrains within the engine before it reaches the combustor where the fuel is injected. The fuel jet injected needs effective and quick mixing for an efficient combustion process. Moreover, the very small convective time scale associated with the airflow demands efficient fuel injection techniques. The injected fuel should mix with the incoming air within a fraction of a second (of the order of 2-10 milliseconds) for an efficient combustion process and heat release.

The embodiments of the system and method provide the advantage of producing supersonic compressible air vortexes with entrained fuel at a very high frequency. The system can inject pulsed packets of an air-fuel mixer at a very high frequency and supersonic speed. The current technologies rely on passive techniques that have control limitations. The embodiments of the system and method provide simple and compact mixing technology for high-speed mixing purposes and applications.

The embodiments of the system and method produce ultrasonic (up to 20 kHz) actuation jets from a very robust design. Compared to plasma technologies, which are considered capable of producing high-frequency modulation, the present system does not require any complicated electromechanical hardware for its installation for integration with various systems requiring or utilizing mixing technology.

FIG. 1A illustrates an active co-axial injector system 100 in accordance with one embodiment. The active co-axial injector system 100 provides an injected co-flowing fluid using a pulsed supersonic air jet blasting up to 20 kHz with a bandwidth of 10 kHz. In FIG. 1A, a microphone 134 is shown in a dashed box because it is for the measurement system and not part of the actual active co-axial injector system 100.

The active co-axial injector system 100 shown in FIG. 1A has several major components. For example, the injector system 100 may include an under-expanded source (air) jet from a steel tube or a cavity 114 of 1.3 millimeter (mm) diameter (ID). For example, a steady jet from a source or source nozzle goes to the inlet of a nozzle assembly 106, such as a Resonance Enhanced Microjet (REM) nozzle assembly.

The injector system 100 may also include an injector assembly 126 made of three plates 108, 110 and 112 with internal cavities 116 and 128 fabricated with the desired cavity volume of 20.6 $mm^3$. The plates are described in more detail in relation to FIGS. 3A-3C. The under-expanded source jet enters the injector assembly 126 at inlet or orifice 104. The injector assembly 126 is a Resonance Enhanced Microjet (REM) nozzle assembly. The injector system 100 may include another steel tube 118 (1 mm ID, 1.5 mm OD) in the assembly 126 that allows pulsed jet flows out of the cavities, such as cavity 116. The output end or exit orifice 130 of tube 118 has an output 124 that produces a pulsed jet from the compressed jet supply entering inlet or orifice 104. The exit orifice 130 is a first outlet.

The injector system 100 may include, in the assembly 126, a separate fluid passage that opens up around the 1 mm steel tube through a circular orifice 132 of approximately 1.96-1.95 mm diameter forming an annular space at the exit of the assembly 126. The circular orifice 132 is a second outlet. The circular orifice 132 connects to the cavity 128. The cavity 128 connects to tube or channel 120 which receives a second fluid jet (i.e., a seeded $CO_2$ jet) from a source (not shown) connected to tubing/conduit coupled to a second inlet 106. This annular space forms a circular slit 136 with a 1.5 millimeters (mm) radius and a thickness of 230 micrometers (μm), as indicated in FIGS. 1A and 1C. The circular slit 136 produces a co-axial annular jet. This co-axial annular orifice injects a steady fluid stream while the central steel tube exits a pulsed actuation air jet. Both the fluids meet co-axially at the exit plane of the assembly 126, as shown in FIG. 1A. The cavity 128 is concentric about the tube 118, for example.

A supersonic pulsed jet comes out of the tube flush with the bottom surface. The details of the fluids meeting co-axially at the exit plane of the assembly 126 is described and shown in FIGS. 9B and 9E, for example. A high frequency pulsed oxidizer from the first outlet and the fuel or a secondary stream from the second inlet via a conduit, exiting through the circular slit, are injected under pressure so that the fuel or secondary stream is entrained in a high frequency vortexes of the oxidizer.

Figure 1B:
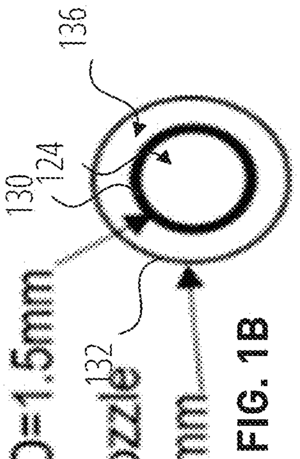
FIG. 1B illustrates a bottom view of a co-axial outlet nozzle assembly in accordance with one embodiment.
Figure 1C:
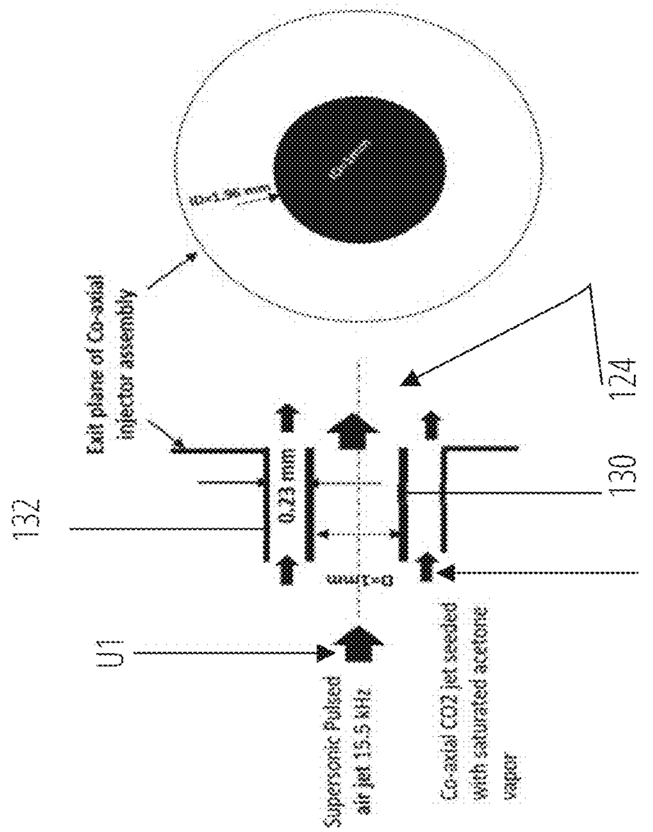
FIG. 1C illustrates a side view of the co-axial outlet nozzle assembly in the circle of FIG. 1A.

FIG. 1B illustrates a bottom view of a co-axial outlet nozzle assembly in accordance with one embodiment. This annular space forms a circular slit 136 with a 1.5 millimeter (mm) radius and a thickness of 230 micrometers (μm), as indicated in FIG. 1A. This co-axial annular orifice injects a steady fluid stream while the central steel tube exits a pulsed actuation air jet. Both the fluids meet co-axially at the exit plane of the assembly 126, as shown in FIG. 1A.

FIG. 1C illustrates a side view of the co-axial outlet nozzle assembly in the circle of FIG. 1A. In FIG. 1C, an exit plane configuration is shown of the assembly 126 where an annular stream of $CO_2$ seeded with saturated acetone vapor interacts with the unseeded compressed nitrogen actuation jet. The present experiments use pressure and the flow rate of 8 psi and 4.7 liters/min, respectively. For a given annular exit area of 1.08 $mm^2$, this flow rate gives an estimated exit velocity of U2 ~50 m/sec for the seeded $CO_2$ jet (i.e., co-axial annular jet). The exit velocity U1 of pulsed jet varies 10-400 m/sec during the cycle giving rise to a velocity ratio U1/U2 variation from 2-8.0.

Figure 9A:
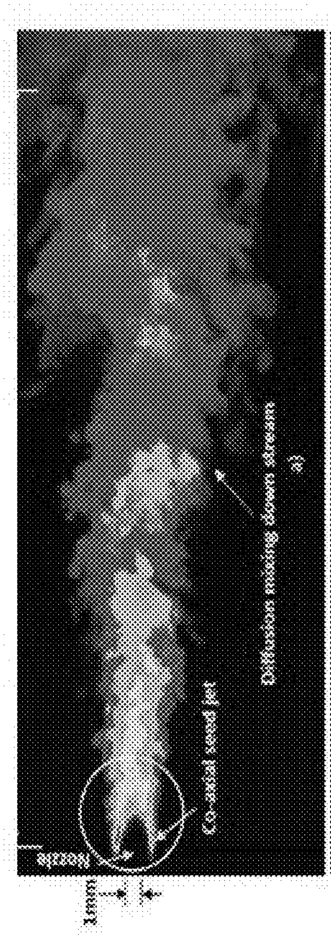
FIGS. 9A-9C show representative instantaneous PLIF images from three test cases of an acetone seeded annular jet (called seed jet) stream alone, an acetone seeded annular jet stream with an actuation jet pulsing at 15.5 kHz, and an acetone seeded jet stream with an actuation jet in a steady mode (without pulsing).
Figure 9B:
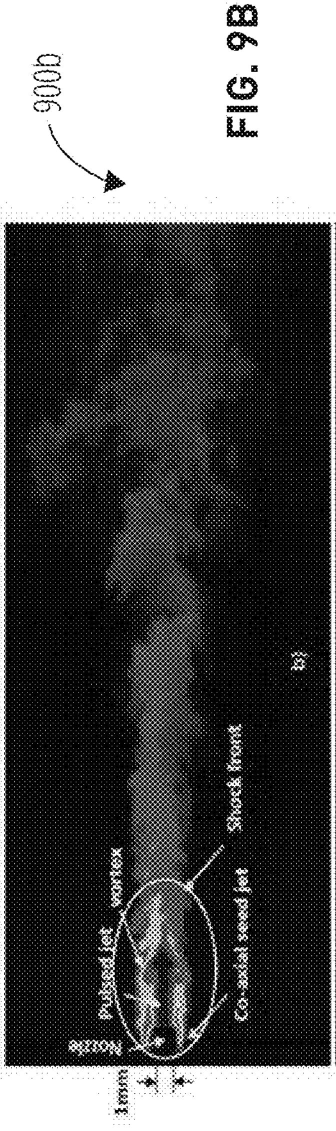
Figure 9C:
Figures 9D, 9E, 9F:
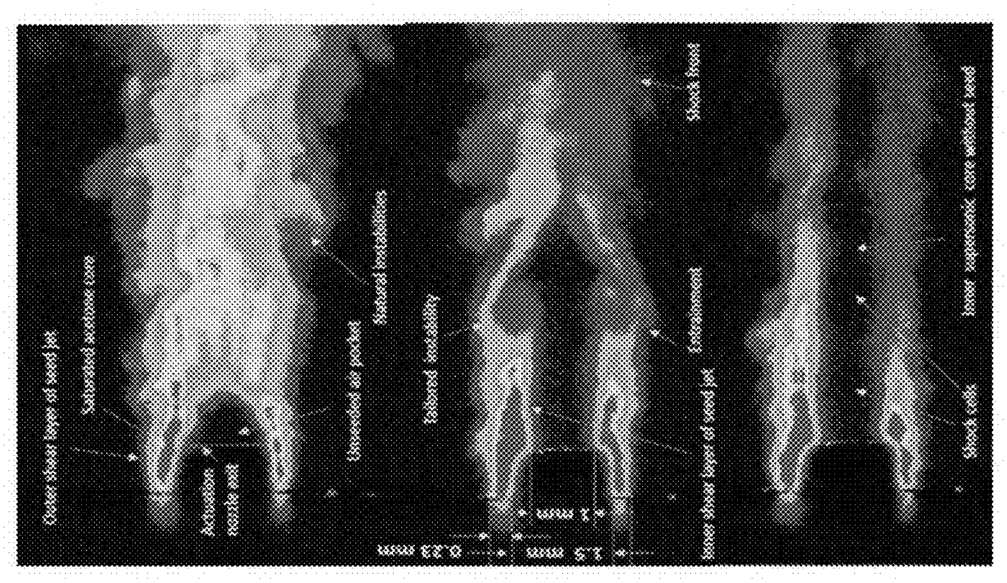
FIGS. 9D-9F are magnified views near the flow exit of the images of FIGS. 9A, 9B and 9C, respectively.

FIG. 1A also shows representative flow patterns of the flow field at the exit of the nozzle assembly when the steady co-axial jet interacts with the central actuation jet, as better shown in FIGS. 9B and 9E. The inner jet velocity U1 has a periodic variation from ~10-400 m/sec, and it generates a highly unsteady velocity profile at the exit. The co-axial annular stream exits with a constant velocity of U2 depending on the injection pressure. Its shear layer is exposed to ambient air and the central pulsing jet on the other side. The high-frequency, pulsed supersonic jets generated uses an actuator design developed by Solomon et al. [14-19] for various high-speed flow control applications. Under suitable geometric and flow conditions, this design can generate unsteady supersonic jets over a large bandwidth of 1-60 kHz. The system 100 is configured to generate the ultrasonic, supersonic pulsed jet in a frequency range of 10-20 kHz.

The actuation jet exiting the nozzle assembly generates high-frequency, pulsed compressible vortexes and shockwaves. The fluid injected through the outer core will get entrained into this fast-moving vortex and diffuses into it as it travels downstream. These vortexes and shockwaves excite the shear layer of annular flow on micro and macro scales, causing enhanced mixing between them. The experiments aim to understand the flow dynamics of this pulsed co-axial assembly using specially designed phase-locked micro-Schlieren imaging and quantitative measurements using planar laser-induced fluorescence (PLIF).

To understand the flow dynamics of this pulsed co-axial assembly described herein, specially designed systems for phase-locked micro-Schlieren imaging and quantitative measurements using planar laser-induced fluorescence (PLIF) were used, as will be described in more detail in relation to FIGS. 5A and 5B. The PLIF is a non-invasive measurement technique. It is suitable for quantifying the mixing characteristics of acetone seeded annular jets that interact with high-frequency, pulsed actuation air-jet and air in the surrounding ambiance.

The PLIF method used herein uses a thin laser sheet of 266 nanometers (nm) wavelength to fluoresce the absorbing species (acetone) in a given measurement volume. Many studies report that acetone fluorescence has a linear variation with concentration and laser power [20-21]. Acetone absorbs ultraviolet light (225-320 nm), but fluoresces in the blue (350-550 nm). The embodiments herein uses $CO_2$ as an annular steady jet stream and compressed nitrogen for generating high-frequency actuator jet pulses. Since the resulting fluorescence is proportional to the amount of the absorbing species in the measurement volume, measuring the intensity of light from the fluorescent molecules captured using an appropriate camera with a filter will quantify the mixing. The mixture fraction calculated at each location usually represents the mixing characteristics of the flow.

An injection system 100 includes a steady jet source that enters the system at 104 to produce an ultra-high frequency pulsed jet output from the exit 130 with a periodic variation and a second steady fluid source to produce a constant velocity stream exiting the system through 136. The system 100 includes a Resonance Enhanced Microjet (REM) nozzle assembly 126. The REM nozzle assembly 126 includes a plurality of plates 108, 110 and 112 including a top plate and a bottom plate, a first inlet or orifice 104 formed in the top surface 102 of the top plate 108 and coupled to the jet source, and the bottom plate 112 including a hollow cavity 128 having a bottom surface. The REM nozzle assembly 126 includes a tube 120 fixedly coupled within the bottom plate 112 and passes through the hollow cavity 128 to form a first outlet 130 flush with an exit side of the bottom plate. The first inlet or orifice 104 and the first outlet 130 being fluid coupled together. The REM nozzle assembly 126 includes a second outlet 132 in the bottom plate 112 and positioned concentric about the tube to form a circular slit 136 around the tube. The circular slit 136 is directly fluidly coupled to the bottom surface of the hollow cavity 128. The assembly 126 includes a second inlet 106 coupled to the secondary fluid stream source and the hollow cavity 128 via a conduit.

A fuel or a secondary fluid is injected under pressure as annular stream. The fuel or secondary fluid will be entrained in the vortexes of the pulsed actuation air jet which is an oxidizer.

The REM nozzle assembly may have a frequency that has an inverse correlation to the volume of REM nozzle. The REM nozzle has a volume of 20.6 $mm^3$. The frequency also depends on several other parameters as described in references [14 and 17].

From the injection system, the first output 124 produces a supersonic actuation jet that includes: an evolving vortex; a moving shockwave; and a wavefront, which significantly impacts a mixing process between the supersonic actuation jet and a co-axial annular jet stream from the circular slit 136.

The circular slit 136 produces the co-axial annular jet, which has a core. The co-axial annular jet of the circular slit 136 surrounds the supersonic actuation jet within the core. The co-axial annular jet of the circular slit 136 is entrained into the evolving vortex of the supersonic actuation jet and diffuses into the supersonic actuation jet as the co-axial annular jet moves downstream.

The injection system 100 may be configured such that the vortex and shockwave excite a shear layer of annular flow of the co-axial annular jet, causing enhanced mixing between the co-axial annular jet and the supersonic actuation jet. The injection system 100 may be configured so that the first outlet (i.e., orifice 130) and circular slit 136 are constructed and arranged to effectuate a plurality of different mixing mechanisms between a co-axial annular jet emitted from the circular slit and a supersonic actuation jet emitted from the first outlet (i.e., orifice 130). The plurality of different mixing mechanism include a first mixing mechanism of the co-axial annular jet and the supersonic actuation jet due to vortex-induced mixing of the co-axial annular jet and the supersonic actuation jet; a second mixing mechanism of the co-axial annular jet and the supersonic actuation jet due to shockwave-induced mixing between the co-axial annular jet and the supersonic actuation jet; a third mixing mechanism of the co-axial annular jet and the supersonic actuation jet, which is due to growth and entrainment of a vortex downstream; and a fourth mixing mechanism of the co-axial annular jet and the supersonic actuation jet, which is from natural diffusion from shear layers of the co-axial annular jet.

In the injection system 100, the first outlet (i.e., orifice 130) and the circular slit 136 form a nozzle exit. Also, the vortex-induced mixing is created by a compressible vortex formed near the nozzle exit. The compressible vortex entrains the co-axial annular jet near the nozzle exit and moves forward with a velocity of 200+ meters/second.

The injection system 100 is configured so that the velocity of the supersonic actuation jet is sonic at the nozzle exit in part of the pulsing cycle. The supersonic actuation jet evolves as an under-expanded jet core downstream surrounded by the co-axial annular jet, in part of the pulsing cycle, where the natural diffusion of the co-axial annular jet to a compressible shear layer of the supersonic actuation jet is a minimum amount near the nozzle exit relative to a diffusion amount at a location downstream of the nozzle exit.

The injection system 100 is configured so that the shock-wave-induced mixing being caused by a pulsing action that produces a shockwave that moves faster than a jet front, causing a breakdown of the shear layer. The injection system 100 is configured so that the pulsing action creates fragmented structures of the co-axial annular jet surrounded by the supersonic actuation jet. The injection system 100 is configured so that the moving shockwave drags some of these fragmented structures in a forward motion, creating a plume of disintegrated co-axial annular jet surrounded by the actuation jet.

The injection system 100 is configured so that the fourth mixing mechanism is the natural diffusion to ambiance from the outer shear layer and an inner shear layer of moving vortexes and the co-axial annular jet and the supersonic actuation jet. The fourth mixing mechanism is caused by the weakening of the actuation jet and formation of natural vortices in a flow along with a diffused wavefront vortex. The actuation jet momentum drops in some part of the pulsing cycle so that the co-axial annular jet momentum dominates the flow with its fragmented structures. In some part of pulsing cycle, the actuation jet speed reduces to subsonic and the co-axial annular jet converges to the center of the actuation jet.

Figure 2B:
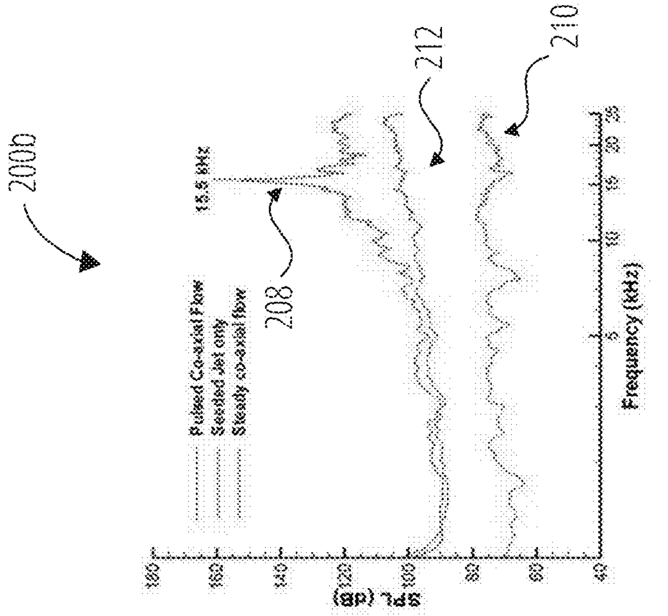
FIG. 2B shows a graphical representation of spectra measured from three cases a) seed jet only, b) pulsed co-axial flow, and c) steady co-axial flow.
Figure 2A:
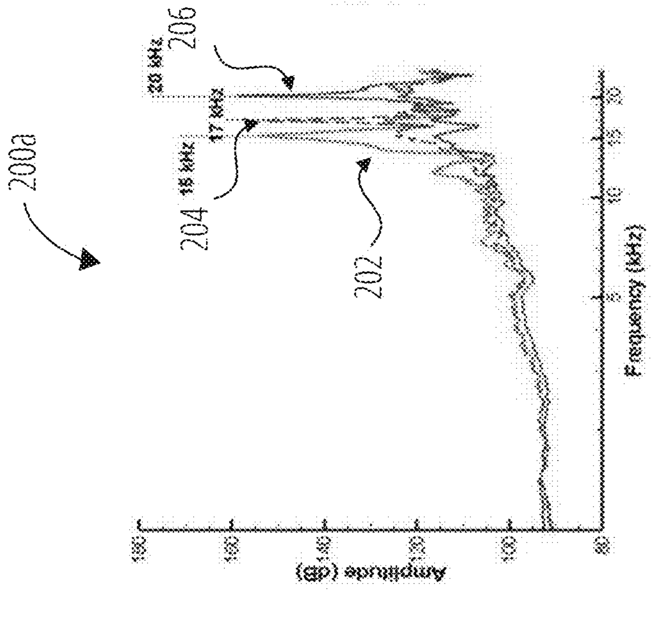
FIG. 2A shows a graphical representation of a frequency spectra of the pulsed co-axial assembly in accordance with one embodiment.

FIG. 2A shows a graphical representation 200A of a frequency spectra of the pulsed co-axial assembly in accordance with one embodiment. The graphical representation 200A is graphed for a frequency range from 0 kilohertz (kHz) to 20 kHz and for an amplitude from 80-180 decibels (dB). FIG. 2A shows the frequency spectra of the actuator integrated into the nozzle assembly measured captured by a Grass™ microphone 134 (FIG. 1A) that picks acoustic signals from the nearfield. The details of the microphone 134 is described in more detail in relation to FIGS. 5A and 5B. The green curve 202 represents the amplitude over a frequency spectra with a peak at approximately 15.5 kHz. The dashed blue curve represents the amplitude over a frequency spectra with a peak at approximately 17 kHz. The red curve 206 represents the amplitude over a frequency spectra with a peak at approximately 20 kHz.

FIG. 1A indicates the microphone's location, which is 40 mm away from the source jet and oriented at an angle of 45° from the vertical. Acoustic data shows that the pulsing frequency varies from 15 to 20 kHz by varying parameter h/d from 1.0 to 1.6, at a constant value of nozzle pressure ratio (NPR)=5.8, where h is the distance of the exit point of the source jet to the actuator cavity and d is the source nozzle diameter. A second microphone simultaneously generates real-time signals for phase-locked imaging of the flow field. A frequency-divided and filtered signal input to the DG645 delay generator outputs digital pulses with appropriate delay (trigger signals) for camera and LED light sources, as shown in FIGS. 5A and 5B. FIGS. 5A and 5B provide details of this measurement and the data processing method used for generating the acoustic spectra.

FIG. 2B shows a graphical representation 200B of microphone spectra measured from three cases: a) seed jet only (red); b) pulsed co-axial flow (green); and c) steady co-axial flow (blue) of FIGS. 9A-9C and related magnified views of FIGS. 9D-9F. The pulsed co-axial flow shows a distinct peak at 15.5 kHz, while the steady co-axial injection shows no specific tones in the spectra other than broadband noise. In steady actuation, energy is in broadband, and it is focused at approximately 15.5 kHz for pulsed actuation. The spectra of the seed jet show low amplitude broadband noise indicating natural instabilities exist in the flow. In FIG. 2B, the green curve 208 represents the spectra for a pulsed co-axial flow, showing a peak at 15.5 kHz. The red curve 210 represents the spectra for a seeded jet only. The blue curve 212 represents the spectra for a stead co-axial flow.

Figures 3A, 3B, 3C:
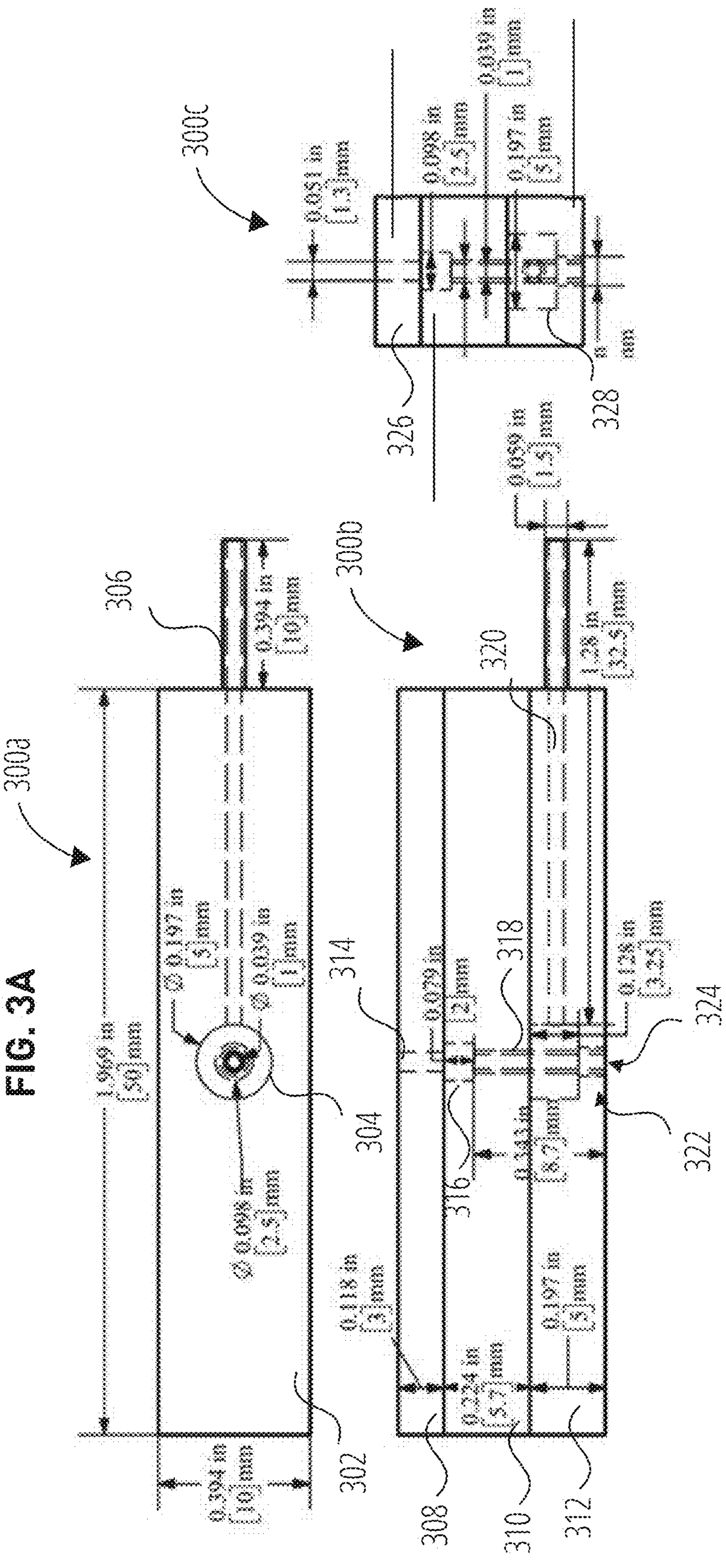
FIGS. 3A-3C illustrate the pulsed co-axial injector assembly with three plates, such as brass.

FIGS. 3A-3C illustrate the pulsed co-axial injector assembly with three plates such as, without limitation, brass plates. FIG. 3A illustrates a top view of a pulsed co-axial injector assembly 300A in accordance with one embodiment. FIG. 3B illustrates a side view of the pulsed co-axial injector assembly 300B of FIG. 3A in accordance with one embodiment. FIG. 3C illustrates an end view of the pulsed co-axial injector assembly 300C of FIG. 3A in accordance with one embodiment.

The top plate 302 contains a 3 mm long, 1.3 mm diameter cavity 314 through which an under-expanded actuator source jet enters the nozzle block. The thickness of the top plate 302 is approximately 3 mm. The second plate 310 has another internal hole/cavity 316 with a length of approximately 2 mm that forms the boundary for the resonance phenomena. A 1 mm (ID) steel tube (with 1.5 mm OD) connects the cavity 316 in the second plate 310 and directs the air jet to flow out from the base of the third (or last) plate 312. The second plate has a thickness of about 5.7 mm. The last plate 312 has a 1.96 mm orifice so that when combined with the second plate 310 and the steel tube with 1.5 mm OD, an annular space is formed outside the 1 mm tube (ID). The thickness of the last plate 312 is approximately 5 mm. The internal cavity 328 in the last plate 312 connects to a steady fluid ($CO_2$) supply line through a steel tube 306 which extends internally to tube 320. The design ensures no interaction or coupling between the co-axial fluids before they reach the exit plane of the assembly.

The assembly has a total internal cavity volume of 20.6 $mm^3$. An under-expanded source jet supplied from a nozzle of 1.5 mm exit diameter (d) enters the assembly through a 1.3 mm orifice 304 located on the first plate 308. The source jet produces pulsed flow through approximately a 1 mm diameter tube 318 integrated into the second and third plates 310 and 312 under suitable resonance conditions. This design allows acetone seeded fluid stream ($CO_2$) injection through the annular space while the central tube delivers a high frequency pulsed actuation jet ($N_2$). The frequency of the REM nozzle assembly may be a function of one or more parameters including geometric parameters (i.e., volume) of the REM nozzle assembly, injection pressure at the first inlet, and steady source jet mass flow rate so that by changing the one or more of the parameters the actuation jet can be operated in a steady mode without pulsation or at a selected frequency.

The assembly includes two nozzle orifices 322 through the last plate 312, as described above in relation to FIGS. 1A-1C. The nozzle orifices 322 produces two jet streams denoted as U1 and U2, as shown in FIG. 1C which are mixed.

Figure 4:
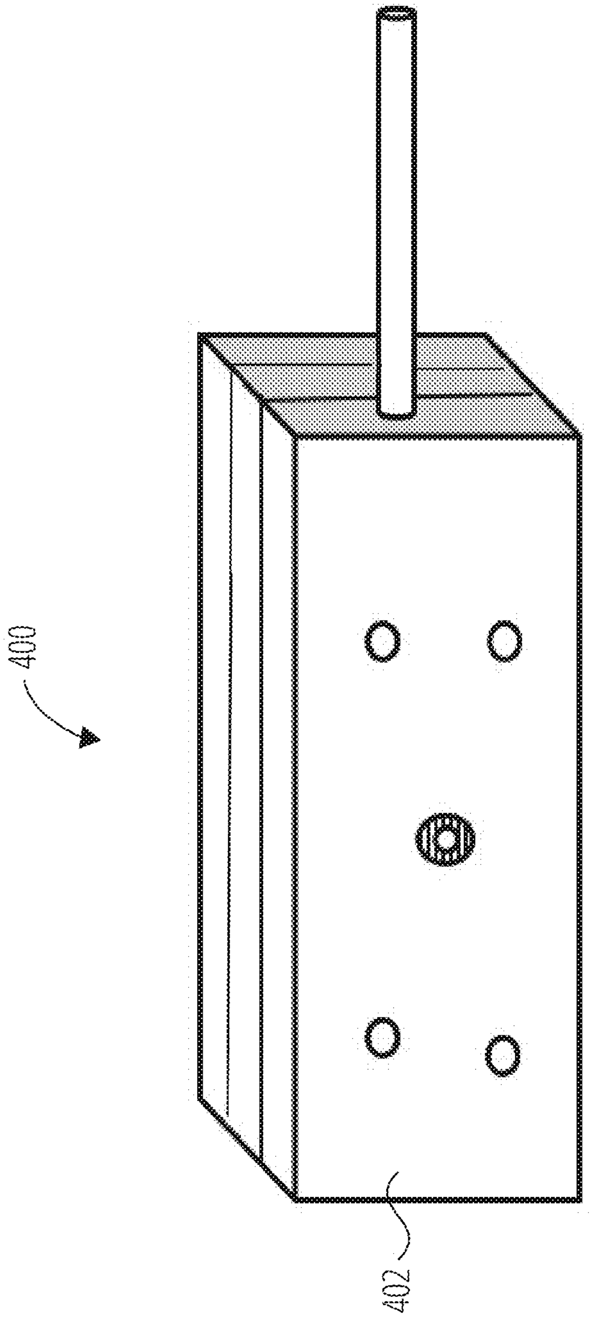
FIG. 4 illustrates a perspective bottom view of the pulsed co-axial injector assembly in accordance with one embodiment.

FIG. 4 illustrates a perspective bottom view of the pulsed co-axial injector assembly 400 (i.e., assemblies 300A, 300B and 300C) in accordance with one embodiment. The bottom exterior face 402 of the last plate (i.e., last plate 312 of FIG. 3B) is shown. From the face 402, the co-axial nozzle orifices 322 produces two jet streams. The experiments conducted used two parameters, h/d or nozzle pressure ratio (NPR), where h is the distance of the exit point of the source jet to the actuator cavity and d is the source nozzle diameter, for frequency control. The present study uses h/d from 1.0 to 1.6 and NPR from 5.8 to 5.5.

Figure 5A:
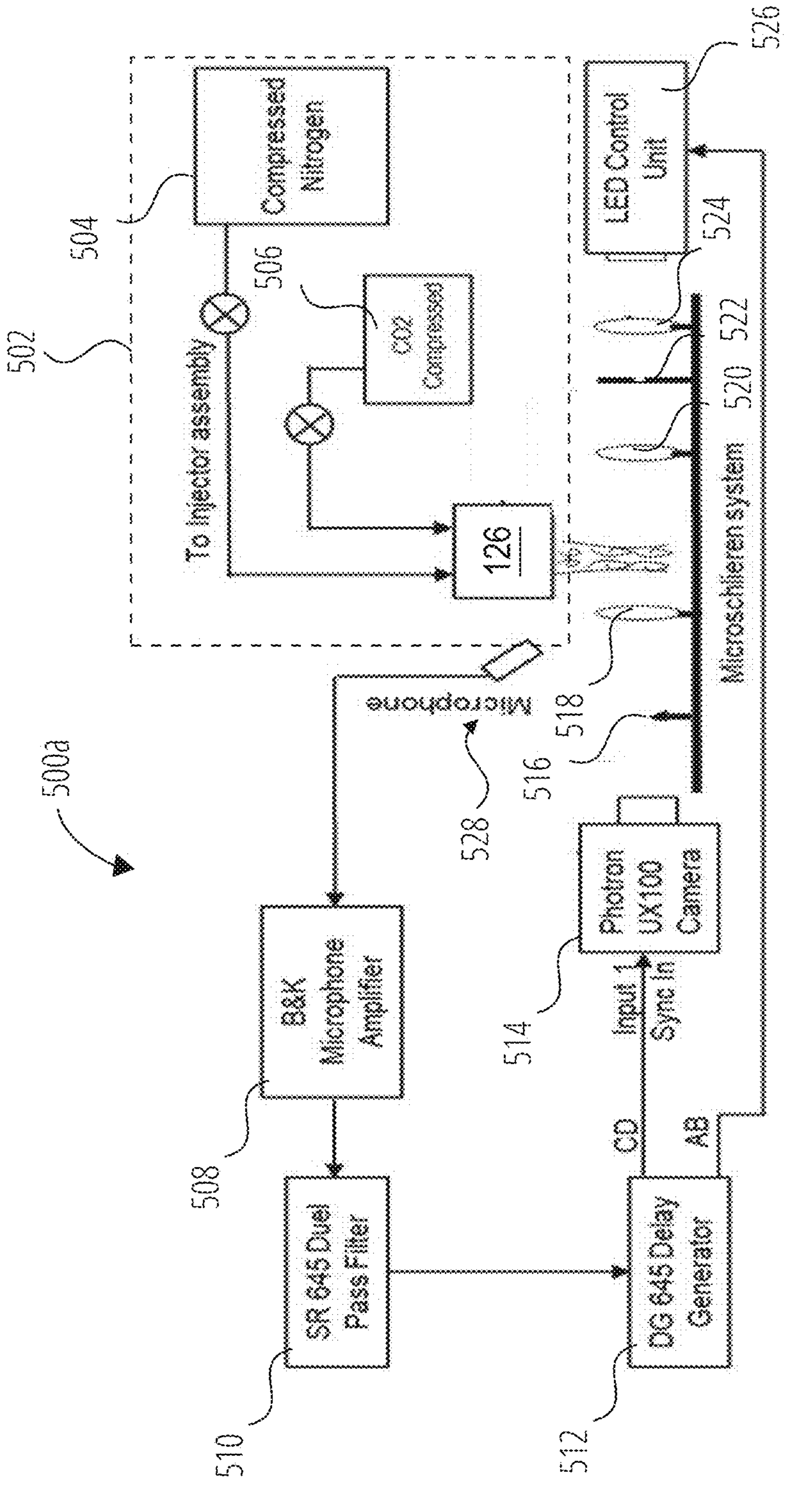
FIG. 5A illustrates a block diagram of a micro-Schlieren system for testing the active co-axial injector system of FIG. 1A.

FIG. 5A illustrates a block diagram of a micro-Schlieren system 500A for testing the active co-axial injector system 100 of FIG. 1A in accordance with one embodiment. The micro-Schlieren system 500A includes a microphone 528 and microphone amplifier 508 coupled to the microphone 528. The system 500A may include a dual pass filter 510 coupled to the microphone amplifier 508. The system 500A may include a delay generator 512 coupled to a camera 514. The camera 514 may be a high-speed camera. The delay generator 512 may be a DG645 delay generator manufactured by Stanford Research Systems. The dual pass filter 510 may be an SR645 dual pass filter manufactured by Stanford Research Systems.

The system 500A may include a knife edge 516, a focusing lens 518, a collimating lens 520 and a condensing lens 524. The knife edge 516 is positioned between the lens of the camera 514 and the focusing lens 518. The system 500A may include a rectangular aperture 522 in-line and between the collimating lens 520 and condensing lens 524. A test section is between the focusing lens 518 and the collimating lens 520. The test section receives the jet stream at the output of the active co-axial injector system 502 (i.e., active co-axial injector system 100).

The active co-axial injector system 502 may include a source of nitrogen 504 that is coupled to the inlet or orifice 104 of the Resonance Enhanced Microjet (REM) nozzle 126 (FIG. 1A). The source of nitrogen 504 supplies a steady under expanded jet to the source nozzle. Although the embodiments are described in relation as a nitrogen source of air, other air sources may be used. The active co-axial injector system 502 may include a source of carbon dioxide ($CO_2$) to supply a steady jet source to produce a constant velocity annular stream.

The experiments were conducted in the microscale flow diagnostic laboratory at Tuskegee University with support from the U.S. National Science Foundation. The experimental setup consists of a vibration-free optical table equipped with state-of-the-art data acquisition and flow imaging systems.

The phase-locked micro-Schlieren image acquisition uses a Photron Mini™ high-speed camera (i.e., camera 514). This monochromatic camera captures up to 4000 frames per second at its full resolution of 1280×1024 pixels. A lens-based micro-Schlieren system 500A has been set up on the optical table for visualizing the microscale supersonic flow field of the active nozzle assembly. The light source in this micro-Schlieren system uses a custom-made light emitting diode (LED) and control circuit 526 that provides white light with a pulse width of 80 nanoseconds (ns). Such a light source with an extremely short pulse duration allows “freezing” and capturing the high-speed microscale compressible flow structures generated by the active nozzle assembly.

In the micro-Schlieren system 500A, a light from the LED is focused onto a sharp rectangular aperture 522 using a condensing lens 524. A 60 mm lens 520 collimates, and another 518 focuses this beam to the edge of a sharp knife with knife edge 516 and cuts the image intensity to half. A camera lens positioned at an appropriate distance captures the image of the flow field kept in the test section between lenses 518 and 520. The pulsing frequency of the actuator is measured using a microphone 134. Another microphone 528 with an amplifier 508 generates signals for phase-locked measurements. This signal goes to a dual pass filter 510 before generating frequency divided, pulsed square waves on output line CD and output line AB using a delay generator 512, with an appropriate delay between the pulses. These signals trigger the camera 514 and the LED 526 (light source) for phase-locked measurements.

A high-pressure compressed nitrogen tank (2000 psi) supplies air to the source jet nozzle coupled to the pulsed jet injector assembly. Compressed $CO_2$ gas was used as the co-axial stream for micro-Schlieren flow visualization studies. A multi-channel oscilloscope monitors all signals used for measurements for accuracy.

Set Up for Planar Laser-Induced Fluorescence (PLIF)

Figure 5B:
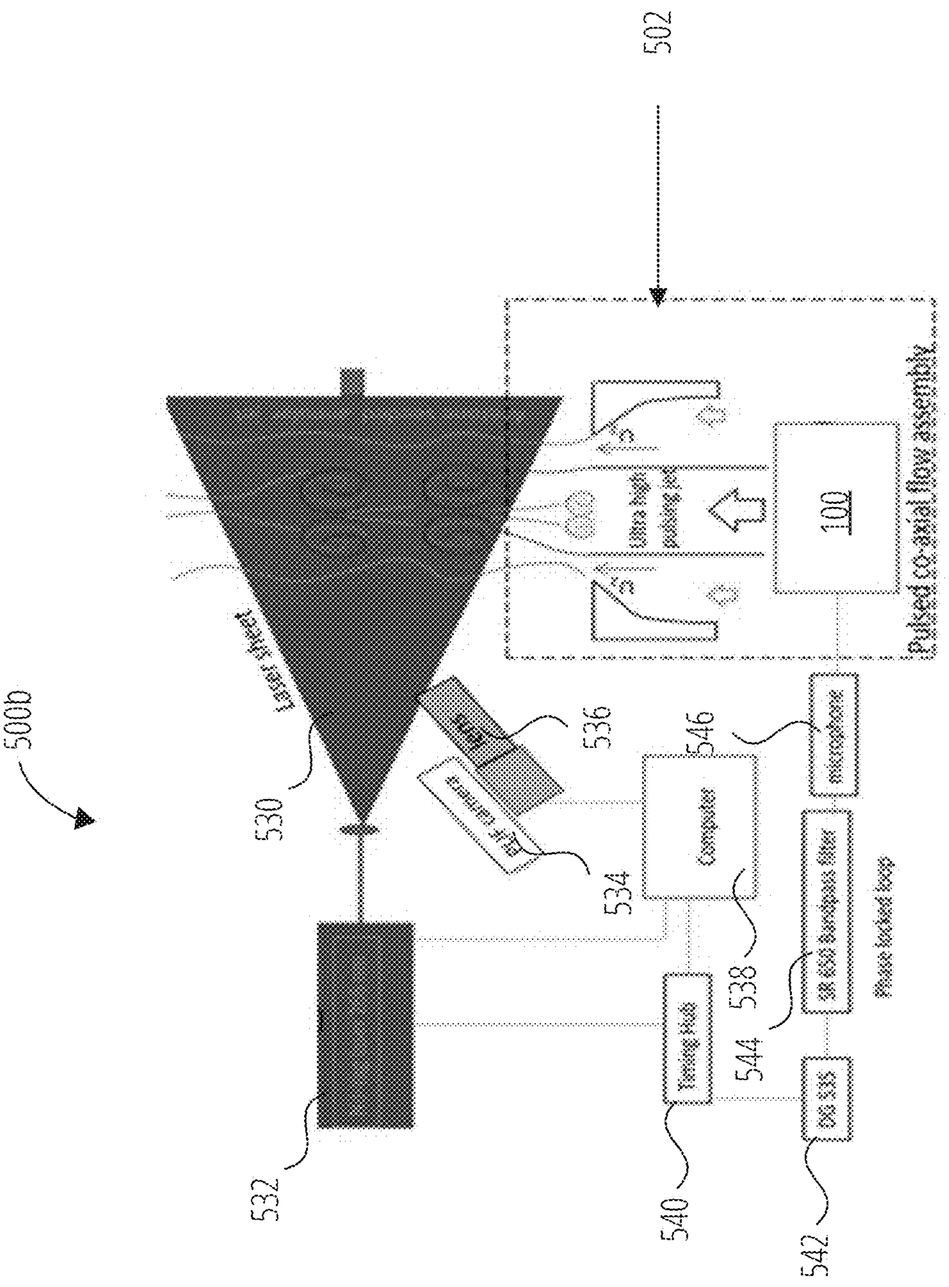
FIG. 5B illustrates a block diagram of a planar laser-induced fluorescence (PLIF) measurement system.

FIG. 5B illustrates a block diagram of a PLIF measurement system 500B. The PLIF imaging uses a setup of the PLIF measurement system 500B established at Tuskegee University. The critical component of this setup is a Quantel EverGreen™ Nd-YAG dual pulsed laser 532 with a choice of pulse energies up to 200 mJ (millijoules) at 532 nm and 30 mJ at 266 nm with a repetition rate of 15 Hz. The PLIF experiments use laser pulses at 266 nm. A Powerview™ LS-LCD camera 534 (29 MP, 6600×4400), with high quantum efficiency, low noise with 1.8 frames/second, selectable 12-bit or 14-bit output, and 100 mm f/2.8 camera lens 536, acquires the images. LCD is liquid crystal display. An eight-channel digital laser pulse synchronizer with 250 ps (picoseconds) resolution controls the laser pulses via a timing hub 540 and the trigger for the camera. The “f” is the f-number defined as a focal length to the diameter of the entrance pupil of the camera. An ultraviolet (UV) optic periscope and adjustable laser sheet optics (LSO) 530 with 266/532 mm AR (anti-reflective) coat create a thin laser sheet at an appropriate test plane in the flow field generated by active co-axial injector system 100. A six-jet oil droplet generator creates saturated acetone vapor in $CO_2$ gas, the seed fluid stream used for mixing experiments. The image acquisition and analysis use INSIGHT4G™ software by computer 538. The PLIF measurement system 500B may include a DG535 delay generator 542 by Stanford Research Systems. The generator 542 is coupled to the timing hub 540 and bandpass filter 544. The bandpass filter 544 may be an SR650 bandpass filter manufactured by Stanford Research Systems. The band pass filter 544 is coupled to the output of microphone 546.

Measurement of Nearfield Spectra of an Actuator Flow Field

The unsteady spectra of the flow field of the active nozzle assembly were measured using a GRAS™ ¼ inch Free-Field Microphone 546 with a sensitivity of 4 mV/Pa. National Instruments™ 9234, 24-bit, 51.2 kHz data-acquisition module acquires the microphone data using LabVIEW™. Fast Fourier transformation (FFT) of time series with 2048 data points and Hanning window with 50% overlap compute acoustic spectra used in the analysis by computer 538. The source jet pressure measurement has an uncertainty of 0.1 psi. The micro-gauge used for linear movements of the nozzle block, for varying the parameter h/d, has an uncertainty of 0.01 mm. A TSI™ Mass Flow Multi-Meter 5300-4 measures the flow rate of acetone seeded $CO_2$ with 2% reading accuracy for measurements up to 300 liters/min.

Apart from microphone measurements, the frequency of the actuator assembly is measured using a high-speed Schlieren imaging technique at the University of Tennessee Space Institute (UTSI). FIG. 6A shows several temporal Schlieren images of the global flow field captured with a camera operating at 200,000 frames/second. These images indicate the flow structures of the actuation jet and the oscillations of the driving source jet. Note that every time-resolved images treat each pixel as an individual measurement of the fluctuating content present within the flow.

FIG. 6A illustrates images 600A of a sequence of instantaneous Schlieren images of the jet from the source nozzle that goes to the inlet of the nozzle assembly and pulsed jet that exit the first outlet at time (t) equal to 0 microseconds (p), 5 μs, 10 μs, 15 μs, 20 μs and 25 μs obtained at 200,000 fps.

Figure 6B:
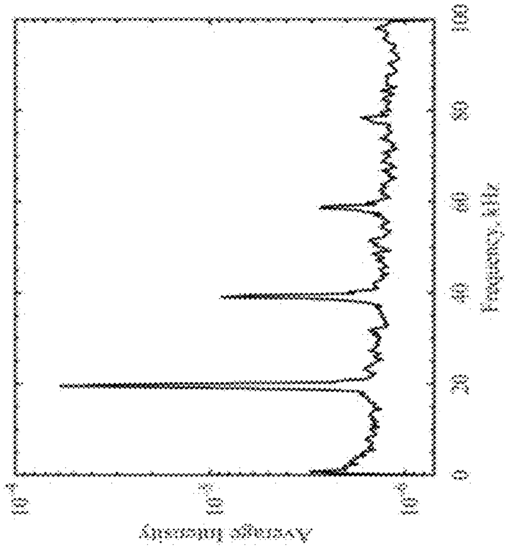
FIG. 6B illustrates a graphical representation of the reduction of time-resolved image sequences shown in FIG. 6A to its spectral content averaged over the entire image domain.
Figure 6A:
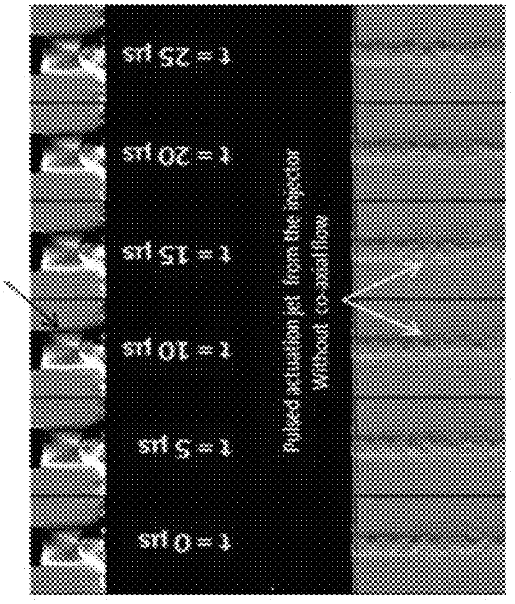
FIG. 6A illustrates images of a sequence of instantaneous Schlieren images of jet from the source nozzle and the actuation jet from the first outlet at time (t) equal to 0 microseconds (p), 5 μs, 10 μs, 15 μs, 20 μs and 25 μs obtained at 200,000 frames per second (fps).

FIG. 6B illustrates a graphical representation 600B of the reduction of time-resolved image sequences to spectral content average over the entire image domain. The graphical representation 600 is shown for an average intensity from approximately $10^{-6}$-$10^{-4}$ and a frequency range from 0 kilohertz (kHz) to 100 kHz. FIG. 6B shows the results from computing the spectra of each pixel and averaging these spectra across the entire image domain. The dominant peak located at approximately 20 kHz is the frequency at which the actuator resonates.

Figures 7A, 7B, 7C, 7D, 7E, 7F, 7G, 7H:
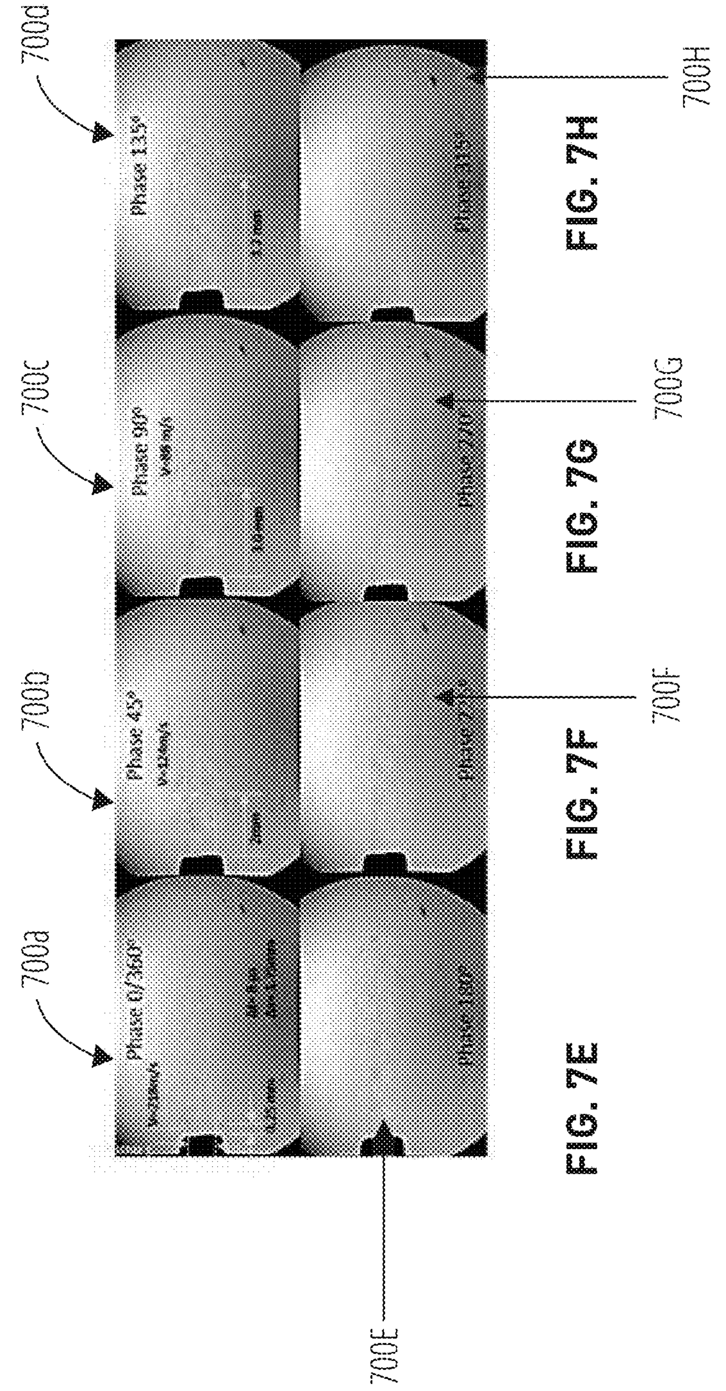
FIGS. 7A-7H show eight phase-locked, instantaneous images of the actuation jet for a cycle (360°) operating at 15.5 kHz without a co-axial $CO_2$ annular stream.

FIGS. 7A-7H show eight phase-locked, instantaneous images 700A-700H of the actuation jet for a cycle (360°) operating at 15.5 kHz without a co-axial $CO_2$ stream. FIG. 7A illustrates a phase-locked, instantaneous image 700A of the actuation jet at a phase of 0°/360°. FIG. 7F illustrates a phase-locked, instantaneous image 700B of the actuation jet at a phase of FIG. 7C illustrates a phase-locked, instantaneous image 700C of the actuation jet at a phase of 90°. FIG. 7D illustrates a phase-locked, instantaneous image 700D of the actuation jet at a phase of 135°. FIG. 7E illustrates a phase-locked, instantaneous image 700E of the actuation jet at a phase of 180°. FIG. 7F illustrates a phase-locked, instantaneous image 700F of the actuation jet at a phase of 225°. FIG. 7G illustrates a phase-locked, instantaneous image 700G of the actuation jet at a phase of 270°. FIG. 7H illustrates a phase-locked, instantaneous image 700H of the actuation jet at a phase of 315°.

Each of these images is 45° phase angle apart and 8-microsecond time interval. These images capture various phases of the evolution of the pulsed supersonic actuation jet in the co-axial injector assembly. The structures indicate that the flow is supersonic in the first 5 phases, nearly sonic in the $6^{th}$ phase, and low subsonic in the last two (270° and 315'). These images also indicate that the pulsed actuation generates a high-frequency compressible vortex and a blast wave in the flow field. The phase-locked images predict a vortex movement of 1.7 mm in 8 microseconds, which is the $\frac{1}{8}^{th}$ of the period of oscillation of the phenomena (15.5 kHz) that gives an average velocity of approximately 218 m/sec near the exit. The speed slows down to approximately 124 m/sec and then to approximately 88 m/sec due to the entrainment and growth of the vortex. In a previous study using a camera with a higher frame rate and reduced resolution also reported that these vortex structures move at ~200 m/near the exit [14]. The strength of the pulsed jet and vortex front deteriorates the latter half of the cycle.

Figures 8A, 8B, 8C, 8D, 8E, 8F, 8G, 8H:
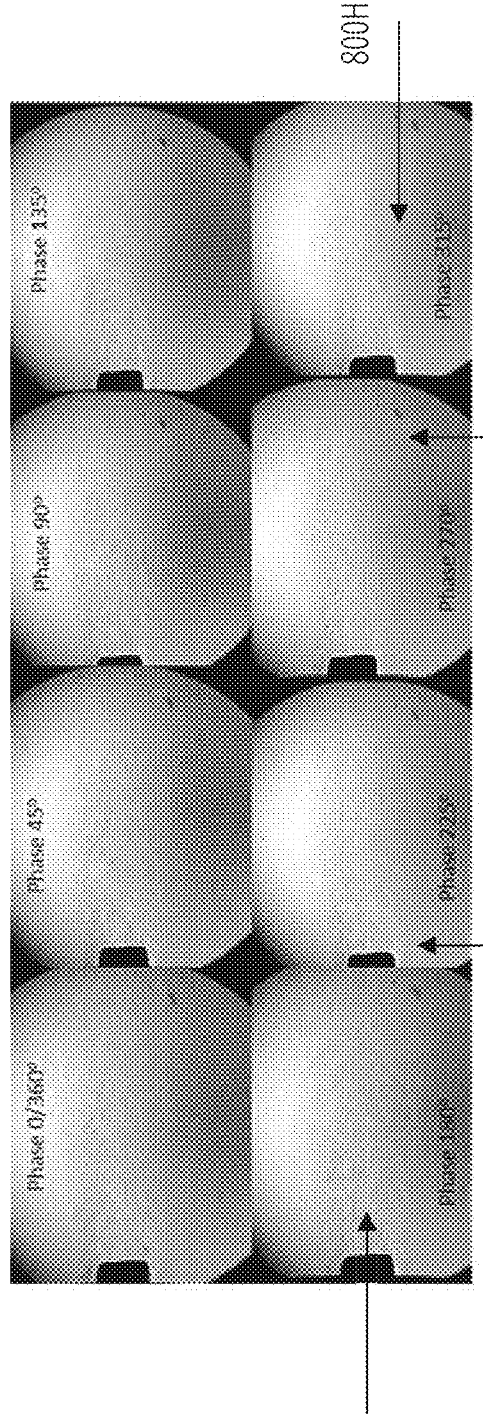
FIGS. 8A-8H illustrate phase-locked instantaneous images of a co-axial $CO_2$ stream injected at a pressure of eight pounds per square inch (psi) while the actuation jet pulses are at the same frequency 15.5 kHz.

FIGS. 8A-8H show phase-locked instantaneous images 800A-800H of a co-axial $CO_2$ stream injected at a pressure of eight psi while the actuation jet pulses at the same frequency. FIG. 8A illustrates a phase-locked instantaneous image 800A of a co-axial $CO_2$ stream injected at a pressure of eight psi at phase 0°/360°. FIG. 8B illustrates a phase-locked instantaneous image 800B of a co-axial $CO_2$ stream injected at a pressure of eight psi at phase FIG. 8C illustrates a phase-locked instantaneous image 800C of a co-axial $CO_2$ stream injected at a pressure of eight psi at phase 90°. FIG. 8D illustrates a phase-locked instantaneous image 800D of a co-axial $CO_2$ stream injected at a pressure of eight psi at phase 135°. FIG. 8E illustrates a phase-locked instantaneous image 800E of a co-axial $CO_2$ stream injected at a pressure of eight psi at phase 180°. FIG. 8F illustrates a phase-locked instantaneous image 800F of a co-axial $CO_2$ stream injected at a pressure of eight psi at phase 225°. FIG. 8G illustrates a phase-locked instantaneous image 800G of a co-axial $CO_2$ stream injected at a pressure of eight psi at phase 270°. FIG. 8H illustrates phase-locked instantaneous image 800H of a co-axial $CO_2$ stream injected at a pressure of eight psi at phase 315°.

The characteristics of pulsed actuator flow with the injected stream shown in FIGS. 8A-8H are very similar to the images 700A-700H as shown in FIGS. 7A-7H. The exit flow area ratio A1/A2 of the present configuration is 0.72, where A1 is the area exit of actuator flow, and A2 is an area of the annular space. With a pressure ratio of fluids exiting the assembly ($P_{act}/P_{stream}$) that varies in the range of 1-13 during the pulsed co-axial injection process, the momentum of the actuation jet dominates the flow field most of the cycle.

FIGS. 9A-9C show representative instantaneous PLIF images from three test cases of a seed jet alone, a seeded jet with an actuation jet pulsing at 15.5 kHz, and a seeded jet with an actuation jet in a steady mode (without pulsing). FIG. 9A illustrates an instantaneous PLIF image 900A of a seed jet alone. FIG. 9B illustrates an instantaneous PLIF image 900B of a seed jet plus a pulsed actuation jet. FIG. 9C illustrates an instantaneous PLIF image 900C of a seed jet plus a steady actuation jet. Ideally, the saturated vapor exiting the nozzle fluoresces with maximum intensity (red color) and unseeded actuation jet with zero intensity (black color). Assuming a linear variation between these two extreme values, the intensity of light fluoresce measured at a given location represents the local mixing of acetone with the surrounding unseeded streams. To perform the experiment, three configurations were chosen, which include: 1) A seed jet alone; 2) a seeded jet with an actuation jet pulsing at 15.5 kHz; and 3) a seeded jet with an actuation jet in a steady mode (without pulsing).

FIGS. 9D, 9E and 9F are magnified view near the injector exit of the images of FIGS. 9A, 9B and 9C, respectively. FIG. 9D illustrates a magnified view of the instantaneous PLIF image 900D of FIG. 9A. FIG. 9E illustrates a magnified view of the instantaneous PLIF image 900E of FIG. 9B. FIG. 9F illustrates a magnified view of the instantaneous PLIF image 900F of FIG. 9C.

FIGS. 9D-9F indicate a magnified flow field near the exit with more flow features marked. The high magnification optics and a high-resolution camera (27 MP) capture fine details of these high-speed microscale flows and their mixing characteristics, as indicated in the PLIF images 900D, 900E and 900F. For all cases, the shear layer boundaries of the seed jet and the natural instabilities present are visible and marked appropriately. For a seed jet at 4.7 psi and 5 liters/min, image 900A shows the formation of a saturated core up to 10 diameters, and the jet stream seems mixed well with the ambient air further downstream by the natural diffusion mechanism.

FIG. 9B shows a representative phase of the flow field when the actuator operates at 15.5 kHz. The pulsing action creates a high-frequency compressible vortex in the same frequency range. This tailored vorticity created at the inner core of the seeded jet leads to the entrainment of the seed jet to the actuator flow. The interfacial area of the vortex increases downstream, resulting in increased entrainment, diffusion, and mixing of the seeded $CO_2$ jet with the actuation jet ($N_2$) and the ambient air.

The moving shock front created by the pulsed vortex, as indicated in FIGS. 9B and 9E, also improves the mixing of the seeded jet with the actuation jet and the ambient air. The inner shear layer of the seed jet experiences highly unsteady vortex movement and growth downstream. In the third case shown in FIGS. 9C and 9F, the actuation jet operates in steady mode. This case is a classical co-axial flow configuration, as indicated in FIGS. 9C and 9F. Proper control of parameter h/d adds or eliminates the pulsing action of the actuation jet at the same source jet pressure. In this case, the jet core without seed particles appears to be extended up to 10d (d=1 mm, the exit diameter of the actuation nozzle) and then weakens. These images indicate that the compressible shear layer of the steady under-expanded jet offers more resistance to the diffusion of co-axial seed particles into the jet core. The diffusion is favorable when the jet core slows down further downstream.

Figures 10A, 10B, 10C, 10D, 10E, 10F, 10G, 10H:
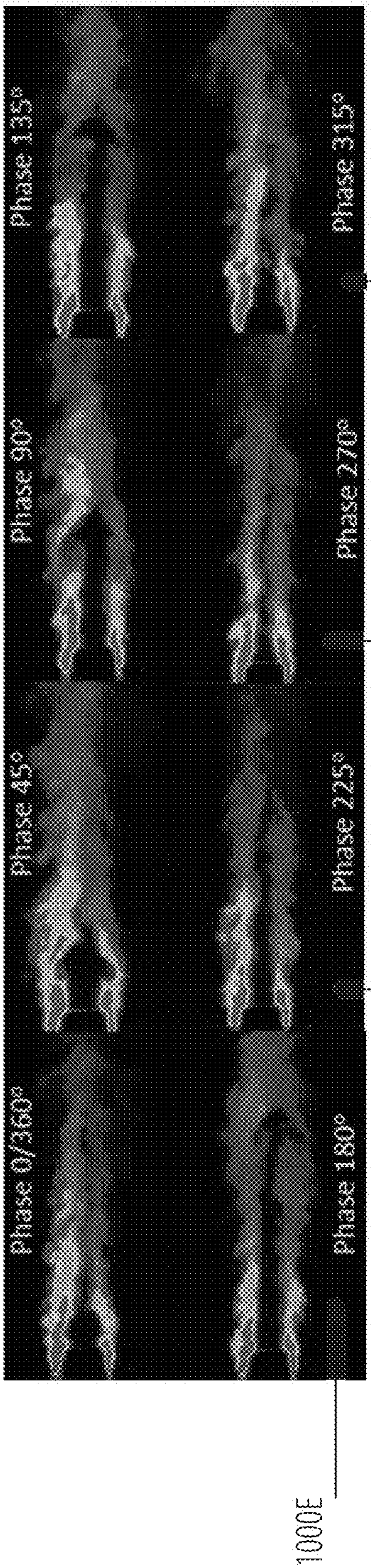
FIGS. 10A-10H show PLIF images of co-axial flow at various phases, each separated by 45°.
Figures 11A, 11B, 11C, 11D, 11E, 11F, 11G, 11H:
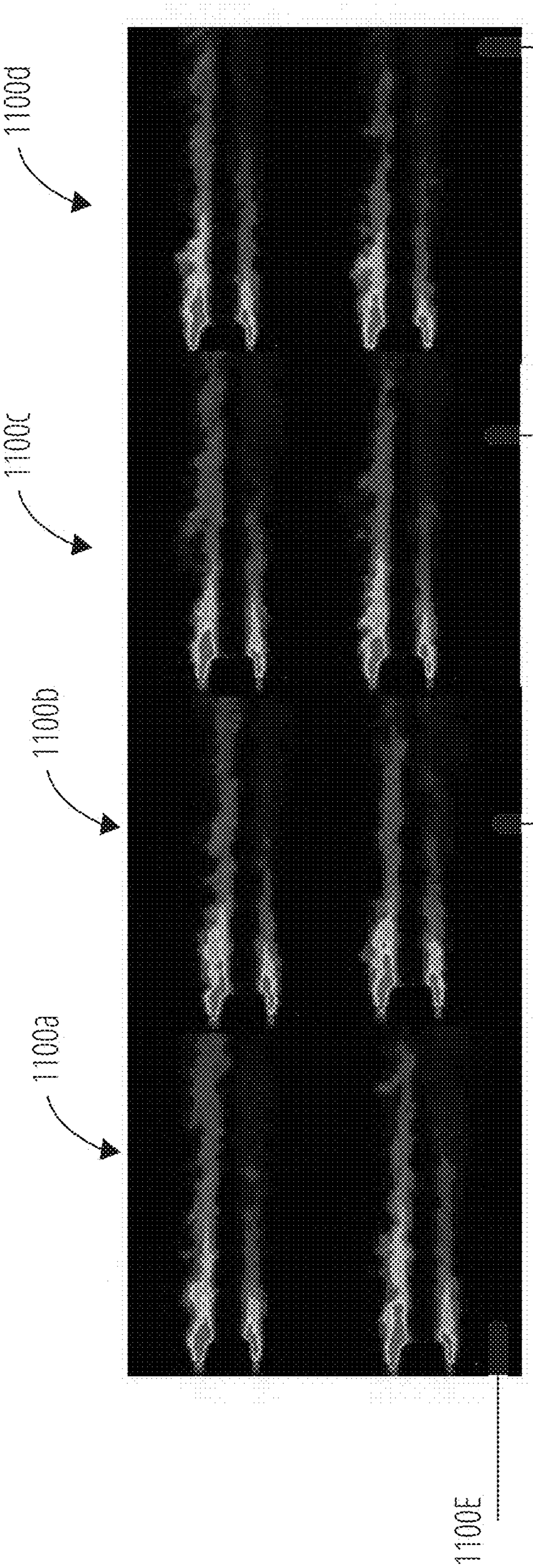
FIGS. 11A-11H illustrate eight random instantaneous images of a seeded jet with a steady jet injection actuation at the core, arranged similar to the phase images displaced in FIGS. 10A-10H for comparison.

FIGS. 10A-10H show PLIF images 1000A-1000H of co-axial flow at various phases, each separated by 45°. FIG. 10A illustrates a PLIF image 1000A of co-axial flow at a phase of 0°/360°. FIG. 10B illustrates a PLIF image 1000B of co-axial flow at a phase of 45°. FIG. 10C illustrates a PLIF image 1000C of co-axial flow at a phase of 90°. FIG. 10D illustrates a PLIF image 1000D of co-axial flow at a phase of 135°. FIG. 10E illustrates a PLIF image 1000E of co-axial flow at a phase of 180°. FIG. 10F illustrates a PLIF image 1000F of co-axial flow at a phase of 225°. FIG. 10G illustrates a PLIF image 1000G of co-axial flow at a phase of 270°. FIG. 10H illustrates a PLIF image 1000H of co-axial flow at a phase of 315°.

The flow features are visibly very similar to the phase-locked micro-Schlieren images 700A-700H discussed earlier in FIGS. 7A-7H. These phase images provide helpful insight into the evolution and decay of the central pulsing jet and the overall dynamics of the diffusion process of the seeded annular stream. To make a direct comparison between steady and pulsed co-axial injections, FIGS. 11A-11H are shown of random instantaneous images.

FIGS. 11A-11H illustrate eight random instantaneous images 1100A-1100H of seeded jet with steady jet injection actuation at the core, arranged similar to the phase images displaced in FIGS. 10A-10H.

Qualitatively, it is evident from FIGS. 10A-10H and 11A-11H that the flow mixing characteristics are very distinct for steady and pulsed co-axial flows. It was noticed earlier that a steady supersonic core tends to be less effective in mixing a co-axial stream and mixing mostly occurs downstream when the core strength deteriorates. Since diffusive mixing is directly related to the relative velocity between the fluid shear layers, the pulsed injection that provides significant velocity fluctuation in the inner core of the co-axial stream will be more effective than the steady co-axial injection. FIGS. 10A-10H and 11A-11H confirm that pulsed co-axial injection offers significantly improved mixing than a classical steady co-axial injection under similar flow conditions and injection pressure.

The zoomed view of the flow at the exit, as shown earlier in FIGS. 9A-9F, reveals the existence of a very small (±3 micrometer) asymmetry for the annular exit. The designed thickness of the annular exit is 0.23 mm, and the images show this value at the top side and 0.20 mm on the bottom side. But this asymmetry distorts co-axial flow downstream. To eliminate this asymmetry and to better understand the flow dynamics, three-phase images (45°, 180°, and 315°) were corrected for symmetry, as shown and described in relation to FIGS. 12A-12C below.

Figure 12A:
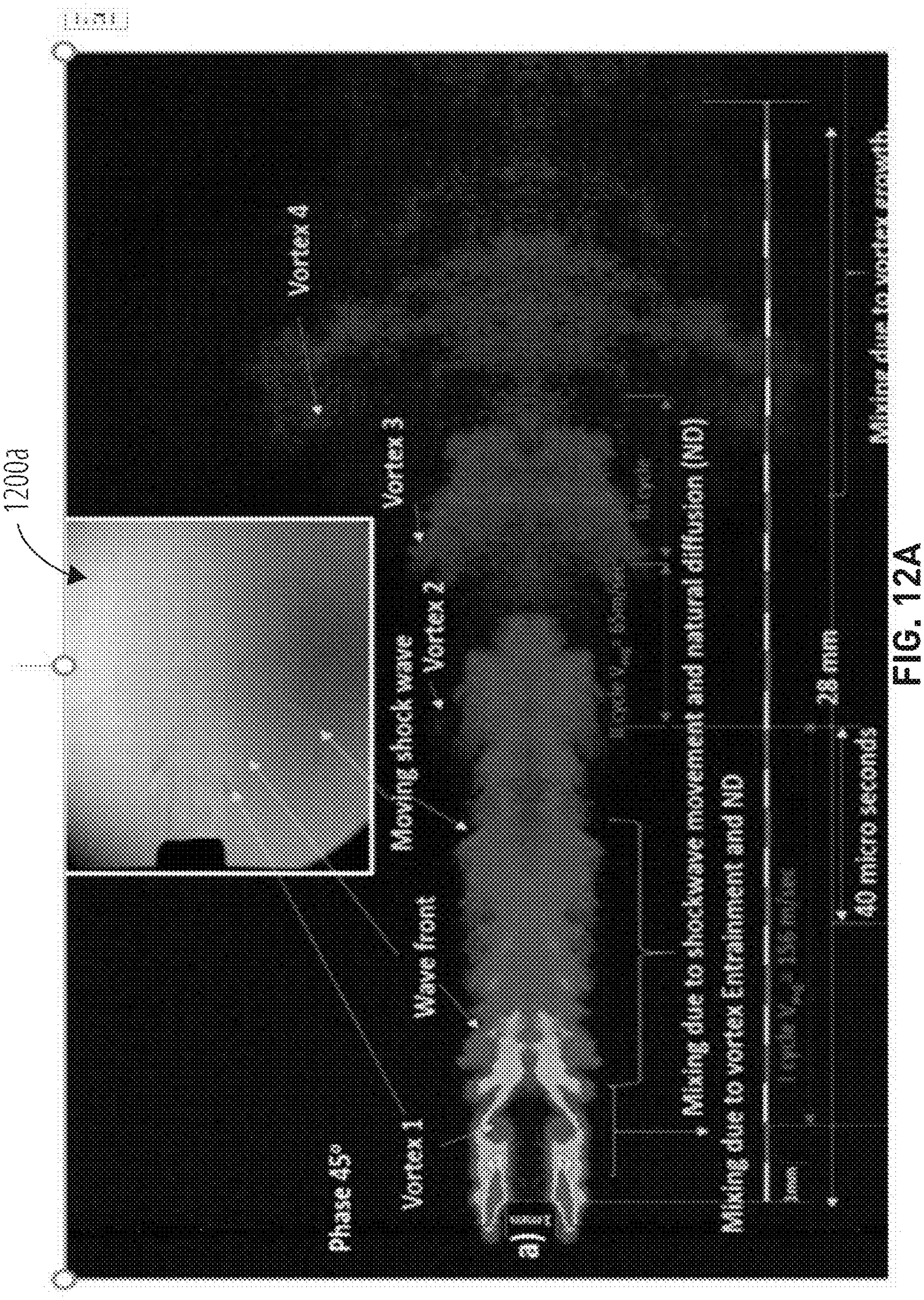
FIGS. 12A-12C illustrate full field view of symmetry corrected PLIF images of co-axial flow at three selected phases which also incorporate a micro-Schlieren image of the actuation jet at same phase angle.
Figure 12B:
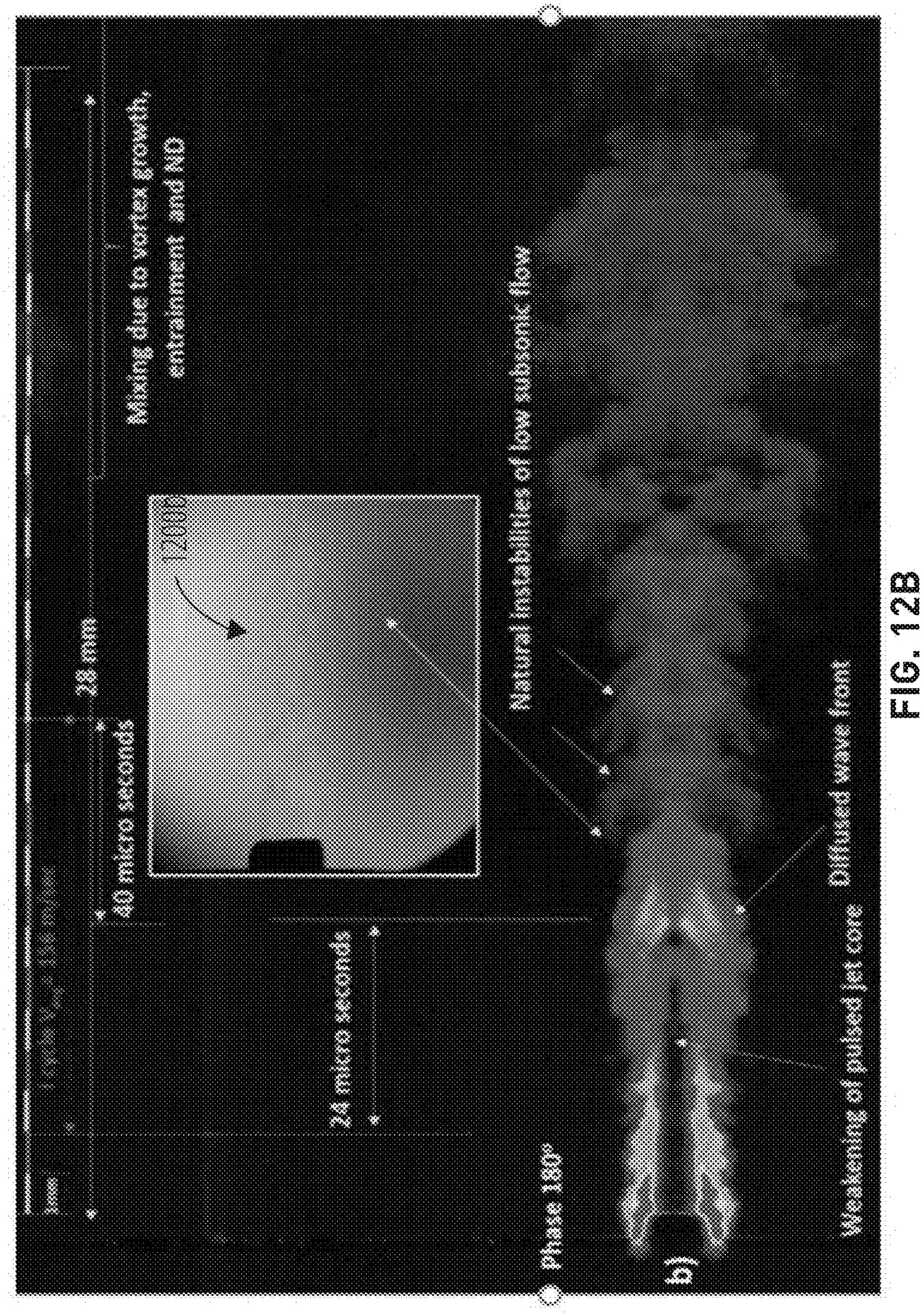
Figure 12C:
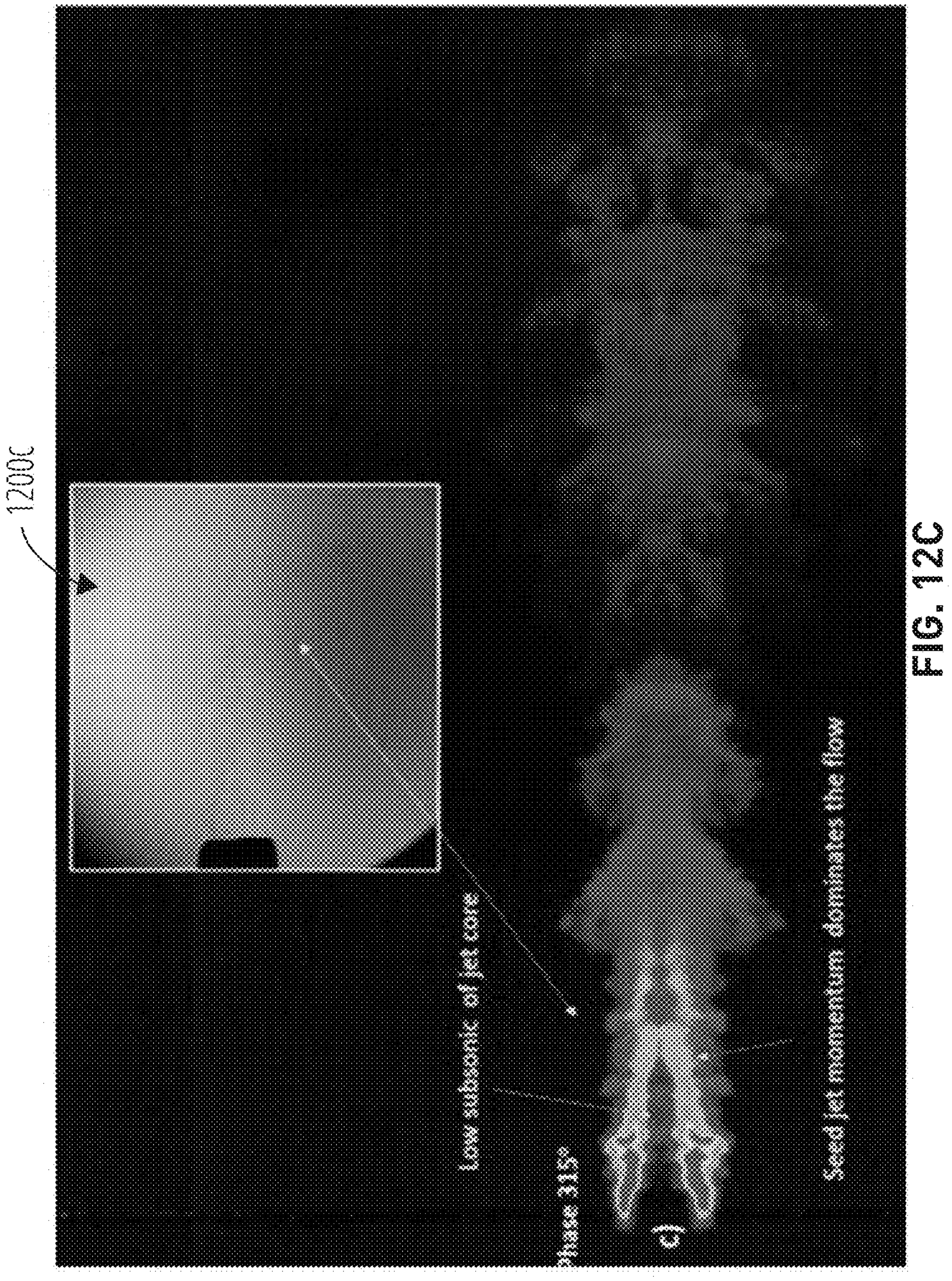

FIGS. 12A-12C illustrate symmetry corrected PLIF images at three phases which incorporates a representative micro-Schlieren images 1200A-1200C of the actuation jet at same phase angles. These images of FIGS. 12A-12C show three key characteristics: an evolving vortex; a moving shock wave; and a wavefront, which significantly impact the mixing process involved with the high frequency pulsed co-axial injection. FIG. 12A illustrates a symmetry corrected PLIF image with a micro-Schlieren image 1200A of the actuation jet at a phase angle of 45°. FIG. 12B illustrates a symmetry corrected PLIF image with a micro-Schlieren image 1200B of the actuation jet at a phase angle of 180°. FIG. 12C illustrates a symmetry corrected PLIF image with a micro-Schlieren image 1200C of the actuation jet at a phase angle of 315°.

In general, four different mixing mechanisms are identified from these images: 1) vortex-induced mixing; 2) shock-induced mixing; 3) mixing due to growth and entrainment of vortex downstream; and 4) natural diffusion from the shear layers of the co-axial streams. In the first mixing mechanism, the compressible vortex formed near the nozzle exit entrains the surrounding seeded stream saturated at the nozzle exit and moving forward with a velocity of 200+m/sec. The actuation jet velocity is sonic at the nozzle exit, and it evolves as an under-expanded jet core downstream surrounded by the co-axial seeded stream during some part of the pulsing phase of the actuation jet. The diffusion of the seeded stream to the compressible shear layer of the jet core is minimum near the nozzle exit during this part of the cycle.

In the second shockwave induced mixing mechanism, the pulsing action produces a shock wave, as indicated in FIG. 12A, that moves faster than the jet front, causing breakdown of the seeded co-axial fluid shear layer ahead of it. This action creates fragmented structures with a high concentration of seed particles surrounded by the unseeded actuation jet. The moving shock drags some of these fragmented structures and its forward motion, creating a plume of disintegrated seed jet surrounded by a co-axial stream, as evident from FIG. 12B, causing better mixing opportunity with the ambient air. The third mixing mechanism owes to the growth and entrainment of the vortexes in the streamwise direction. In the present image data, the PLIF camera setup provides a field of view up to 30 mm in the streamwise direction and 20 mm in the spanwise direction. FIGS. 12A and 12B are temporally connected. For a phase angle difference of 135° (from 45° to 180°), the vortex and the wavefront move a period of 24 microseconds. Since the cycle period is 64 microseconds as measured by the spectra (15.5 kHz), the second vortex eye seen in FIG. 12A is 40 microseconds separated from the wavefront seen for phase angle 180° of FIG. 12B. This vortex 2 captured in the image is the one that precedes vortex 1. The vortex 1 and vortex 2 locations are separated by a distance of 10 mm, as indicated in a scale shown in FIG. 12A. An estimated average velocity is approximately 156 msec for its movement for a cycle from the nozzle exit. This estimate is close to the average velocity observations from phased micro-Schlieren images 700A-700H shown in FIGS. 7A-7H.

The image of FIG. 12A marks two more vortex eyes in the image as vortex 3 and vortex 4, which must be preceded by vortex 2 in order. The velocity estimate shows that growth and entrainment slow down to −65 and 60 msec, respectively, for these two vortexes.

Finally, the fourth mechanism of mixing is the natural diffusion to the ambiance from the outer and inner shear layer of the moving vortexes and the co-axial streams. Apart from the tailored vortices numbered 1-4, the natural instability-driven vortex patterns are visible when the actuation stream slows down to subsonic speeds.

The image 1200B of FIG. 12B shows a weakening of the actuation core in some part of the pulsing cycle and formation of natural vortices in the flow along with the diffused wave front vortex 1. In the final phases of the pulsing cycle, the actuation jet momentum drops considerably so that the seeded jet momentum dominates the flow and the resulting flow structures.

The image 1200C of FIG. 12C shows that at the actuation jet's subsonic speed, the seed jet core converges to the center, and the mixing occurs mainly due to the natural diffusion process.

Figure 13A:
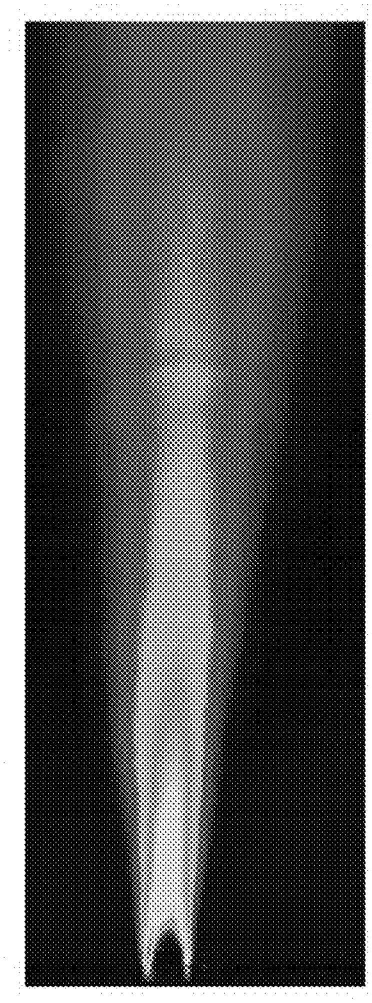
FIGS. 13A-13C show averaged images for each case calculated using 250 instantaneous PLIF images.
Figure 13B:
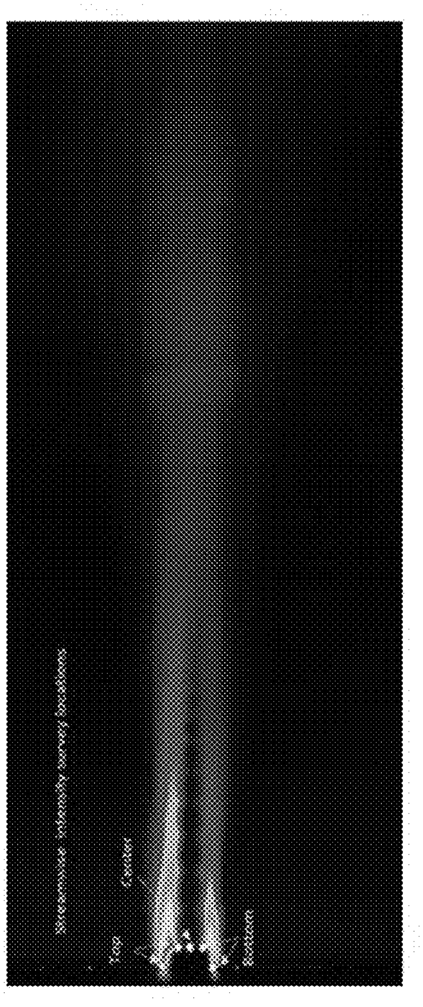
Figure 13C:
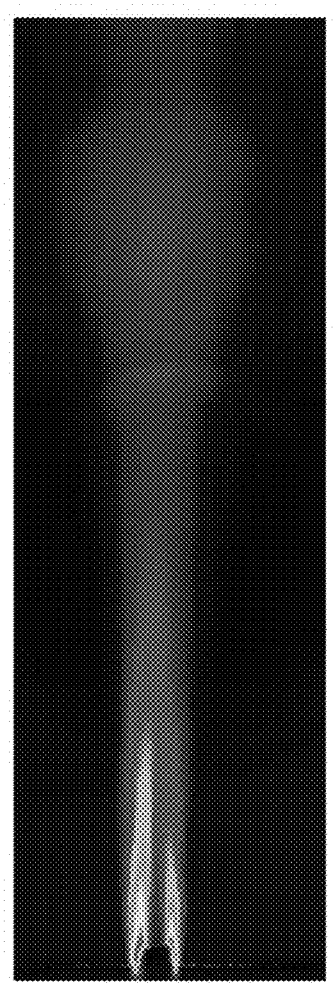

FIG. 13A-13C show averaged images 1300A-1300C for each of the three test cases calculated using 250 instantaneous PLIF images. Since each instantaneous image contains information on 4-5 cycles, as discussed in FIGS. 12A-12C, the average image represents information on ~1000 cycles for the pulsed injection case. These averaged images provide a comprehensive view of all three cases' mixing characteristics and provide reasonably accurate quantitative estimates of the effectiveness of mixing effectiveness between the cases. The intensity of each pixel in the averaged PLIF image is proportional to the average acetone concentration around that elemental volume for the image sequences selected. An average of all pixel intensity provides a simple estimate of acetone concentration in a given field of view for a particular case.

FIG. 13A illustrates an average of 250 instantaneous PLIF images 1300A using a seeded jet alone. For this first case, seed jet alone, this number is 44.3.

FIG. 13B illustrates an average of 250 instantaneous PLIF images 1300B using a seeded jet and a steady actuation. For this second case, when an unseeded steady actuation jet flows through the core, the acetone content is measured as an average intensity in the same field of view, which changes due to fast relative motion between the streams. The average intensity of pixels measured for this case drops significantly to 7.5.

FIG. 13C illustrates an average of 250 instantaneous PLIF images 1300C using a seeded jet and a pulsed actuation at 15.5 kHz. The same calculation for pulsed injections shows this average intensity value as 15.9. This calculation estimates that the mixing effectiveness of pulsed co-axial injection is 114% more than the steady co-axial injection for the same injection pressure.

Figure 14B:
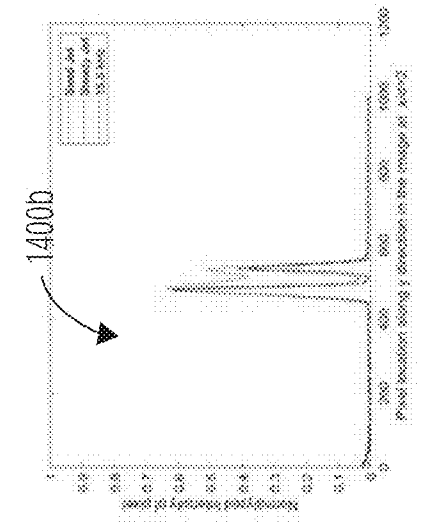
FIGS. 14A-14H illustrate graphical representations of the average intensity profiles of pixels at various streamwise locations of images shown in FIGS. 13A-13C.
Figure 14D:
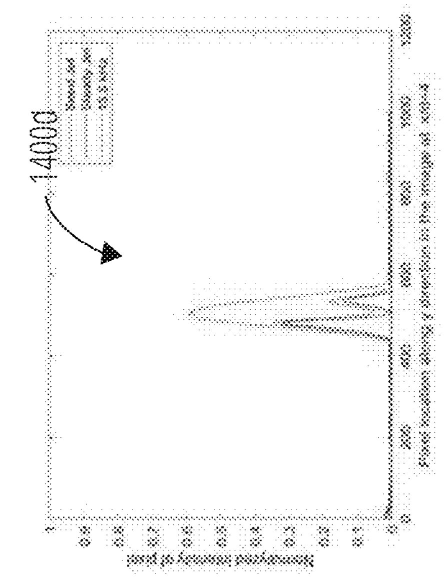
Figure 14A:
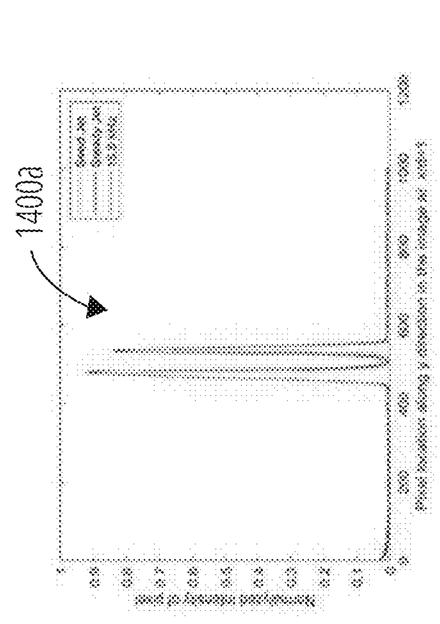
Figure 14C:
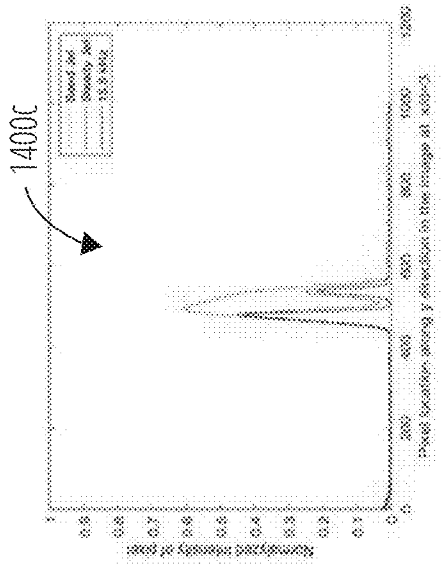
Figure 14E:
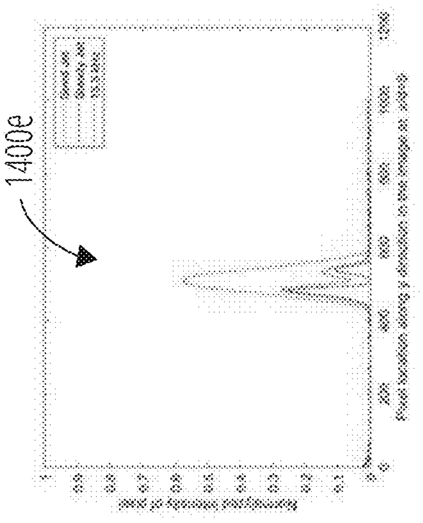
Figure 14F:
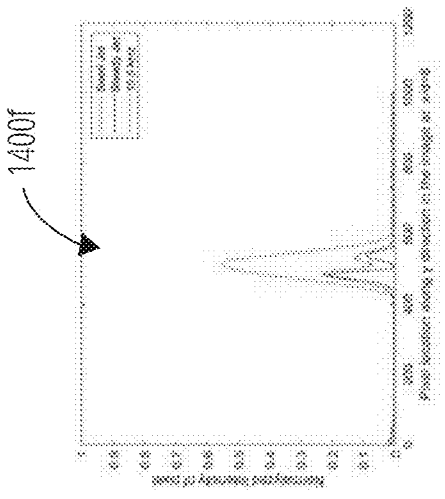
Figure 14G:
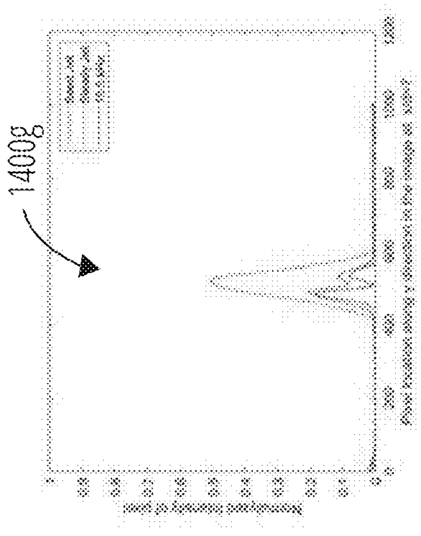
Figure 14H:
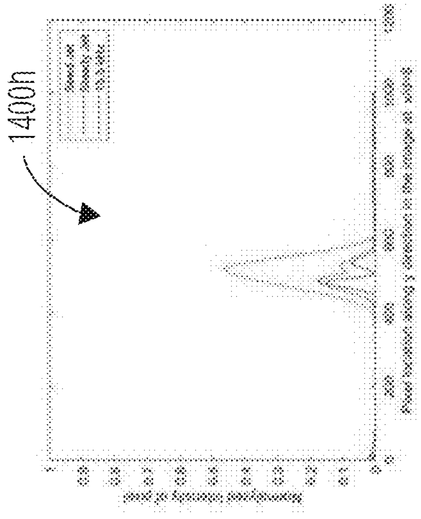

FIGS. 14A-14H illustrate graphical representations 1400A-1400H of the average intensity profiles of pixels at various streamwise locations of images shown in FIGS. 13A-13C. FIG. 14A illustrates graphical representations 1400A of a normalized intensity of a pixel based on the pixel location along a y direction in the image at x/d=1. FIG. 14B illustrates graphical representations 1400B of a normalized intensity of a pixel based on the pixel location along a y direction in the image at x/d=2. FIG. 14C illustrates graphical representations 1400C of a normalized intensity of a pixel based on the pixel location along a y direction in the image at x/d=3. FIG. 14D illustrates graphical representations 1400D of a normalized intensity of a pixel based on the pixel location along a y direction in the image at x/d=4. FIG. 14E illustrates graphical representations 1400E of a normalized intensity of a pixel based on the pixel location along a y direction in the image at x/d=5. FIG. 14F illustrates graphical representations 1400F of a normalized intensity of a pixel based on the pixel location along a y direction in the image at x/d=6. FIG. 14G illustrates graphical representations 1400G of a normalized intensity of a pixel based on the pixel location along a y direction in the image at x/d=7. FIG. 14H illustrates graphical representations 1400H of a normalized intensity of a pixel based on the pixel location along a y direction in the image at x/d=8.

In FIGS. 14A-14H, the acetone seed jet profiles (green curve) show two maxima up to x/d=2 and then diffuses into a single jet structure. Seed density remains high in the core region, and it drops in the streamwise direction as expected. The jet width increases gradually as the jet diffuses in the downstream direction. The unseeded steady and pulsed co-axial flow (blue and red curves) profiles show two distinct peaks in all streamwise locations. A slight geometric asymmetry at the exit nozzles creates more seeded acetone jet flow at the top side than at the bottom. Since pixel intensity directly correlates to the seed density, this results in an asymmetric intensity profile with higher intensity on the top location of the assembly indicated in FIGS. 13A-13C.

The intensity profiles in all x/d locations indicate that the pulsed co-axial flow creates a significantly improved distribution of seeded acetone in the field of view than the steady jet operates at the same pressure. Profiles of FIGS. 14E-14H indicate the mixing of seeded jet and the unseeded actuation jet increases as it flows downstream. As discussed earlier in FIGS. 12A-12C, this enhanced mixing is attributed to the entrainment and growth of high-frequency vortex generated by the pulsed jets and through the shock wave diffusion through the interface of the seeded and unseeded flow downstream. Comparison of the jet width of steady and pulsed co-axial also gives indications of better mixing between the seeded jet and unseeded supersonic actuation jet when pulsing at 15 kHz. The profiles examined at various locations of x/d also reflect the mixing effectiveness of high frequency pulsed actuation estimated based on the average image intensity.

To better understand the mixing characteristics, several locations are chosen on the exit of the injector assembly, as indicated in FIG. 13B, the top, bottom, center, and top and bottom shear locations to plot the intensity profile along the streamwise direction.

Figure 15B:
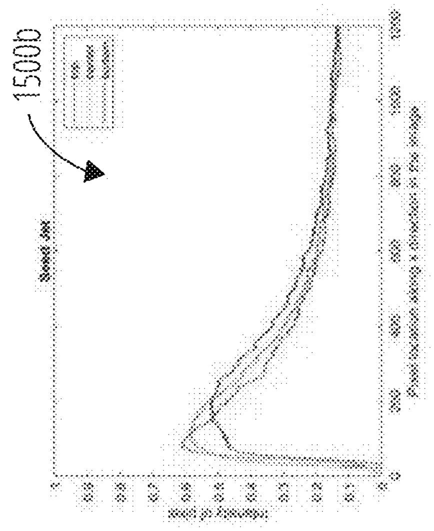
FIGS. 15A and 15B illustrate graphical representations of normalized intensity profiles of averaged images of a seed jet in streamwise direction at various locations.
Figure 15A:
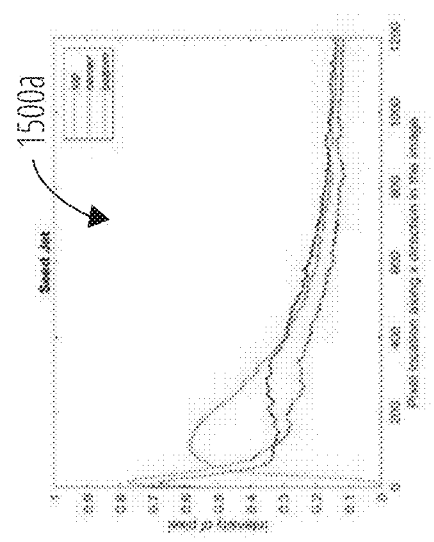

FIGS. 15A and 15B illustrate graphical representations 1500A and 1500B of normalized intensity profiles of averaged images of a seed jet in streamwise direction at various locations. FIG. 15A illustrates graphical representations 1500A of normalized intensity profiles of averaged images of a seed jet in streamwise direction at top (red), bottom (blue) and center (green) locations. FIG. 15B illustrates graphical representations 1500B of normalized intensity profiles of averaged images of a seed jet in streamwise direction at shear layer locations at top (red), center (green) and bottom (blue) locations.

In FIGS. 15A and 15B, the profiles show intensity varies continuously in the axial direction. A careful look at the profiles of the seed jet indicates the intensity at the top location is high compared to the bottom side due to the asymmetry at the exit. A slight downward inclination of the seeded jet core, as evident from FIG. 13A (above), results in higher intensity values at the bottom location on the downstream side, as observed in FIGS. 15A and 15B.

Figure 16B:
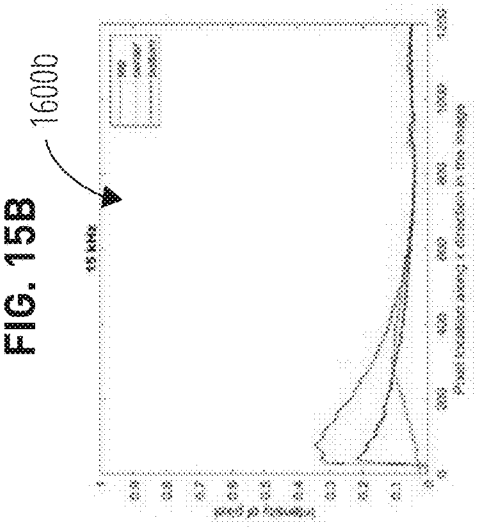
FIGS. 16A and 16B illustrate graphical representations of normalized intensity profiles of averaged images of pulsed jet in streamwise direction at various locations.
Figure 16A:
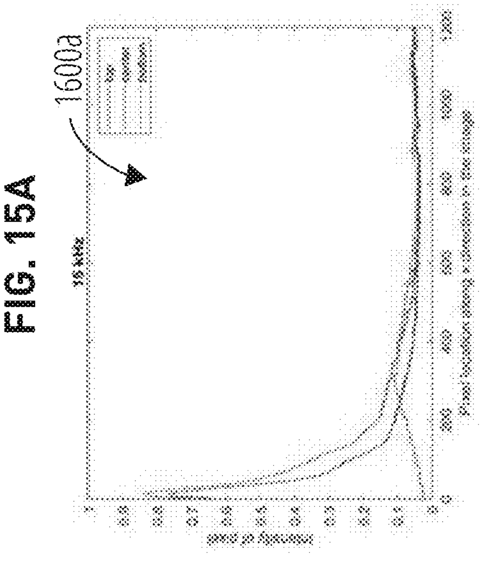

FIGS. 16A and 16B illustrate graphical representations 1600A and 1600B of normalized intensity profiles of averaged images of pulsed jet in streamwise direction at various locations. FIG. 16A illustrates graphical representations 1600A of normalized intensity profiles of averaged images of a pulsed jet in streamwise direction at top (red), bottom (blue) and center (green) locations. FIG. 16B illustrates graphical representations 1600B of normalized intensity profiles of averaged images of a pulsed jet in streamwise direction at shear layer locations at top (red), center (green), and bottom (blue) locations.

Figure 17B:
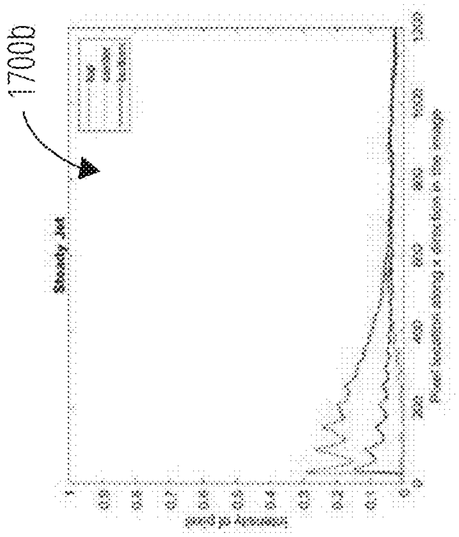
FIGS. 17A and 17B illustrate graphical representations of normalized intensity profiles of averaged images of steady jet in streamwise direction at various locations.
Figure 17A:
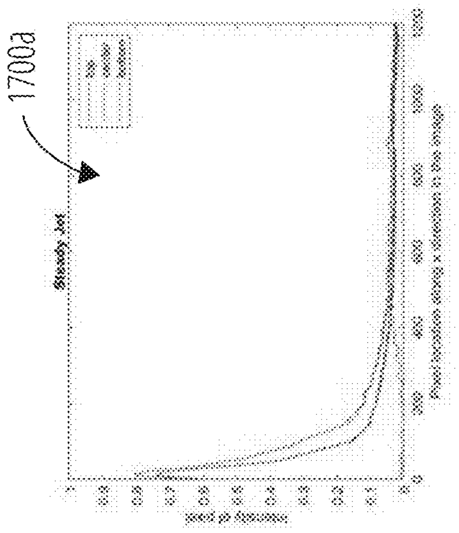

FIGS. 17A and 17B illustrate graphical representations 1700A and 1700B of normalized intensity profiles of averaged images of steady jet in streamwise direction at various locations. FIG. 17A illustrates graphical representations 1700A of normalized intensity profiles of averaged images of steady jet in streamwise direction at top (red), bottom (blue) and center (green) locations. FIG. 17B illustrates graphical representations 1700B of normalized intensity profiles of averaged images of steady jet in streamwise direction at shear layer locations at the top (red), center (green) and bottom (blue) locations.

FIGS. 16A, 16B, 17A and 17B show intensity profiles of pulsed co-axial jets and steady co-axial jets at various exit locations. These profiles show the same level of intensity level near the nozzle exit.

For example, FIGS. 16A and 17A (green curve) indicate the centerline intensity in the axial direction for the pulsed and steady co-axial flow configurations. The mixing is minimum near the nozzle exit for steady co-axial flow. As evident from FIG. 16B, the pulsed flow provides significantly enhanced mixing near the nozzle exit for the same pressure input to the actuation source jet. Far downstream, the centerline intensity levels become similar in both configurations.

A comparison of acetone intensity in the shear layer profile shown in FIGS. 16B and 17B indicates that the pulsed co-axial actuation provides enhanced mixing characteristics in the shear layer than steady co-axial injection. The saw tooth patterns of intensity seen in FIG. 17B are due to the steady jet's under-expanded jet structure at 65 psi pressure. The compressible shear layer of the jet at this high pressure offers more resistance to the diffusion across the shear layer at supersonic speed. Profiles in FIG. 17A also indicate that the higher injection pressure does not favor mixing in the vicinity of the injector in case of steady injection.

Figure 18B:
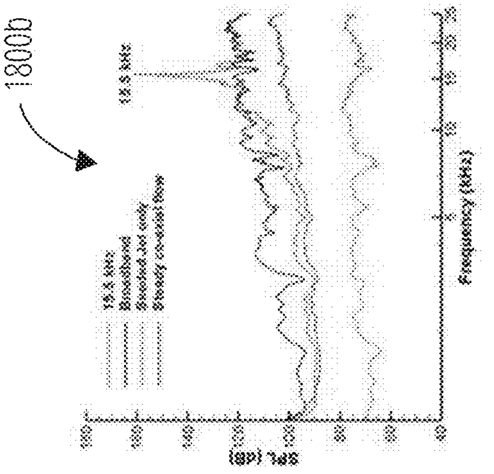
FIG. 18B illustrates graphical representation of the frequency spectrum of pulsed actuation jet operating at 15.5 kHz with a steady actuation jet and seed jet and actuation jet operating in a broadband unsteady regime.
Figure 18A:
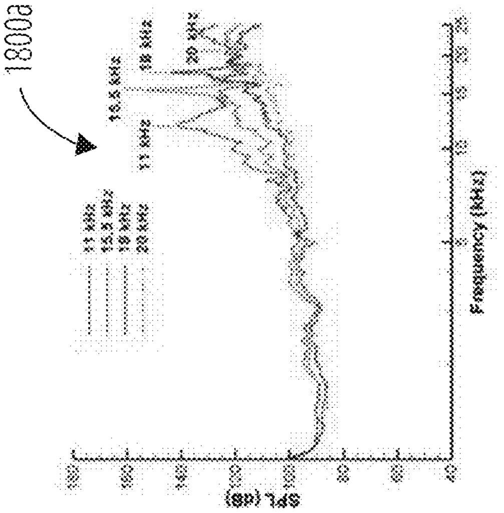
FIG. 18A illustrates a graphical representation of the frequency spectrum of the pulsed actuation jet used in this study.

FIGS. 18A and 18B show spectra measured for pulsed steady co-axial flow and the seed jet configuration. Another actuation case explored is an actuator resonance mode in a broadband regime. This broadband spectrum is shown in FIG. 18B with a black curve.

FIG. 18A illustrates a graphical representation 1800A of the spectrum of high frequency pulsed co-axial jets used for this study with a frequency sweep of pulsed actuation jet. The PLIF data shows that pulsed jets operating at 15.5 kHz improves by approximately 114% more mixing than a steady co-axial flow under-expanded jet operating in the same pressure input pressure. The experiments were conducted with an actuator operating at 11-20 kHz to understand this phenomenon further. The graph includes frequencies at 11 kHz (red), 15.5 kHz (green), 18 kHz (blue) and 20 kHz (light blue dash, dot line).

FIG. 18B illustrates graphical representation 1800B of the spectrum of co-axial jets used for this study with the spectra 15.5 kHz (green) of pulsed actuation, steady co-axial flow (blue), broadband actuation(black) and seed jet alone (red).

Figure 19:
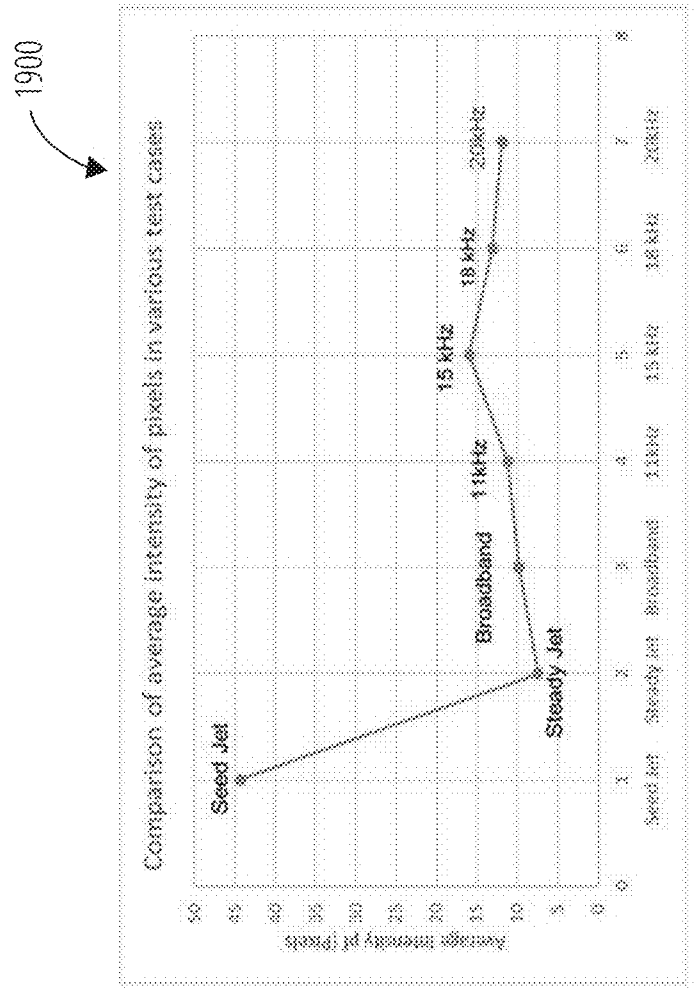
FIG. 19 illustrates a graphical representation of a summary of the average intensity of acetone seeded $CO_2$ stream calculated from averaged images for various tests.

FIG. 19 illustrates a graphical representation 1900 of a summary of the average intensity of acetone seeded stream calculated from averaged images for various test cases. The test cases include seed jet, steady jet, broadband and frequencies at 11 kHz, 15 kHz, 18 kHz and kHz. The average pixel intensity of various configurations is 44.3, 7.4, 9.8, 11.2, 15.9, 13.1 and 11.9, respectively, for seed jet, broadband, 11 kHz, 15 kHz, 18 kHz and 20 kHz. The corresponding percentage changes from steady jet mixing value (7.4) is 33%, 50%, 114%, 76% and 60%, respectively. The highest amplitude actuation with 15.5 kHz provides the maximum value for the average intensity.

Figure 20:
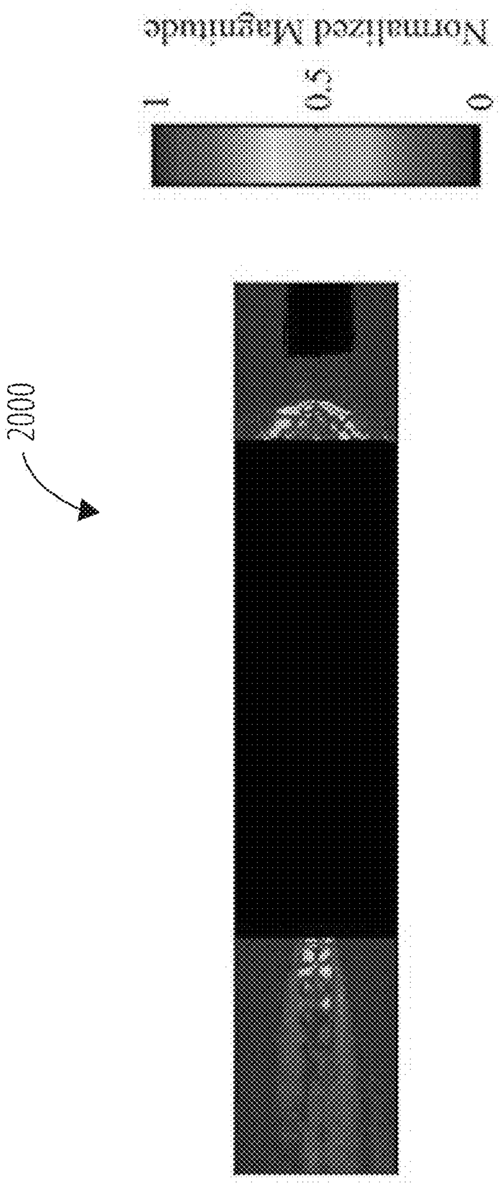
FIG. 20 illustrates a contour mapping of the relative intensity of the actuation jet pulsing at 20 kHz peak derived from the Schlieren images.

FIG. 20 illustrates a contour mapping 2000 of the relative intensity of the 20 kHz peak from the Schlieren images. The image representative of the mapping 2000 shown in FIG. 9 maps the high-amplitude peak by considering each pixel independently. Here, the contour levels, which are representative of the normalized intensity of the fluctuating content, appear centered around the 20 kHz peak shown in FIG. 2A. These two distinct frequency measurements, one using a microphone and the other using the time-resolved Schlieren technique, confirm the ultra-sonic frequency excitation capability of the actuator integrated into the co-axial nozzle assembly.

Figure 21:
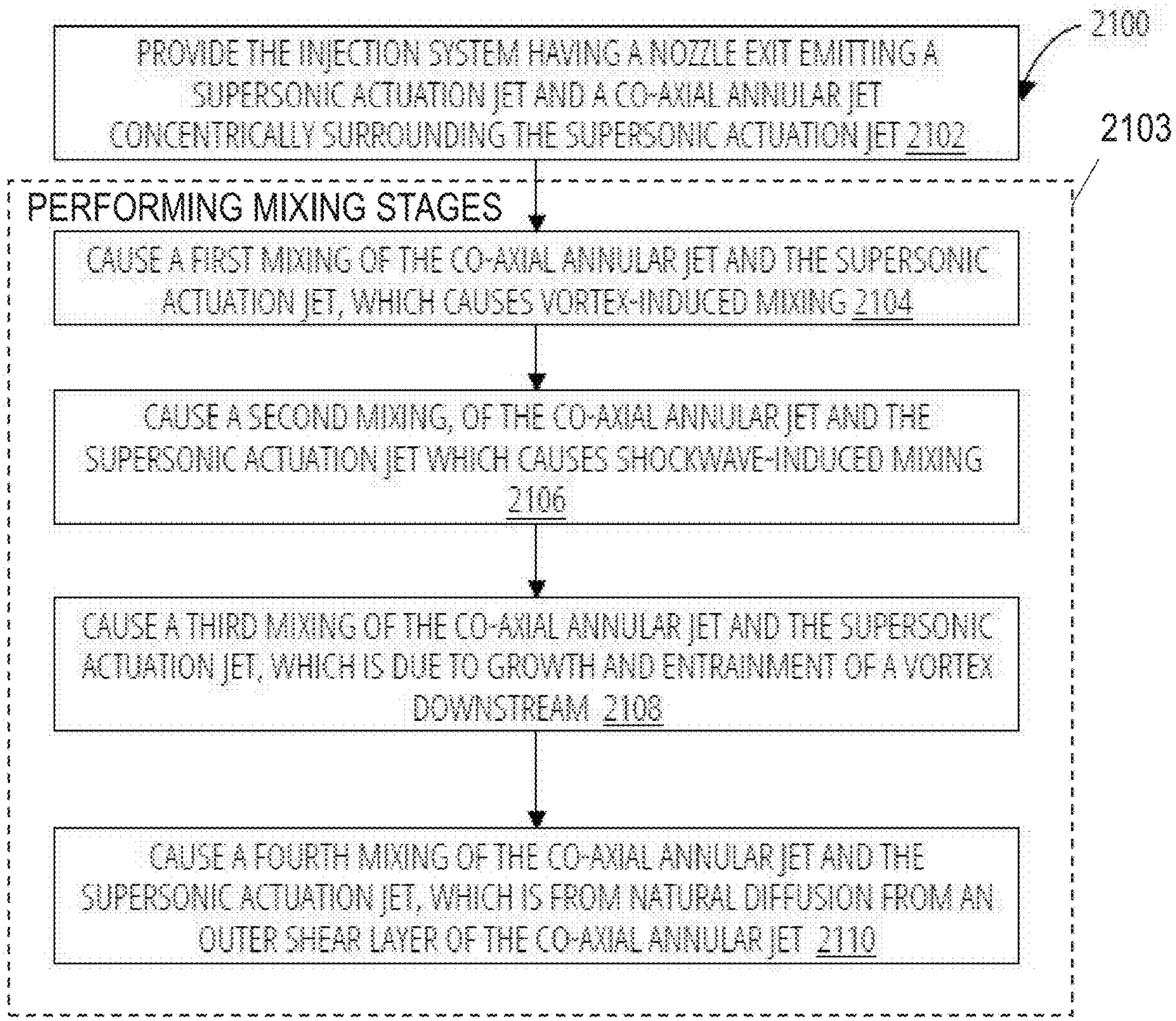
FIG. 21 illustrates a flow chart of a method for flow mixing of a high-frequency, supersonic pulsed actuation air jet with a secondary fluid stream using vortex and shock induced mixing technique, which is highly useful for hypersonic and supersonic flow mixing applications.

FIG. 21 illustrates a flow chart of a method for flow mixing of a high frequency, supersonic pulsed actuation jet stream and a secondary fluid stream using vortex and shock induced mixing technique which is useful for hypersonic and supersonic flow mixing applications. The annular fluid stream actuated with high-frequency, supersonic pulsed actuation jet will mix more effectively with air moving at hypersonic or supersonic velocity, a condition experienced inside a scramjet combustor. An annular jet stream actuated with high frequency supersonic actuation air jet may also be used for designing effective cooling technologies for applications in extreme conditions such as experienced in a nuclear reactor, high-power density electronics, or gas turbines or for similar applications where high rate of mixing and heat removal is desirable.

The method of mixing using the injection system 100 described above significantly improves the mixing of the actuation jet with the steady stream injected up to 115% in comparison to an actuation method that uses a steady actuation jet under same operating pressure. This method improves mixing significantly due to high-frequency vortexes and shockwaves generated by the injector and vortex entrainment evolution and diffusion from the shear layer of the actuation co-axial stream. By changing the frequency and amplitude the actuation jet the high-speed mixing can be controlled in extreme conditions. Such a system may be used for effective mixing in hypersonic applications and for designing cooling systems for extreme heat removal from high-density electronics.

A flow chart of a method 2100 is for flow mixing of a pulsed supersonic air jet stream and secondary fluid stream using vortex and shock induced mixing. The method blocks may be performed in the order shown or a different order. One or more of the blocks may be performed contemporaneously. One or more blocks may be added or omitted.

In block 2102, method 2100 may include providing the injection system of FIG. 1A having a nozzle exit emitting a supersonic actuation jet and a co-axial annular jet concentrically surrounding the supersonic actuation jet. The method 2100 includes performing mixing states, at block 2103. The mixing stages may include at least four stages, described below in blocks 2104, 2106, 2108 and 2110.

In block 2104, method 2100 may include causing a first mixing of the co-axial annular jet and the supersonic actuation jet due to vortex-induced mixing. In block 2106, method 2100 may include causing a second mixing of the co-axial annular jet and the supersonic actuation jet due to shockwave-induced mixing. In block 2108, method 2100 may include causing a third mixing of the co-axial annular jet and the supersonic actuation jet, which is due to growth and entrainment of a vortex downstream. In block 2110, method 2100 may include causing a fourth mixing of the co-axial annular jet and the supersonic actuation jet, which is from natural diffusion from the inner and outer shear layers of the co-axial annular jet.

The mixing operation performed by the first, second, third and fourth mixing blocks is significantly improved by 50-115% compared to a steady co-axial injection under the same injection pressure conditions.

Figure 22:
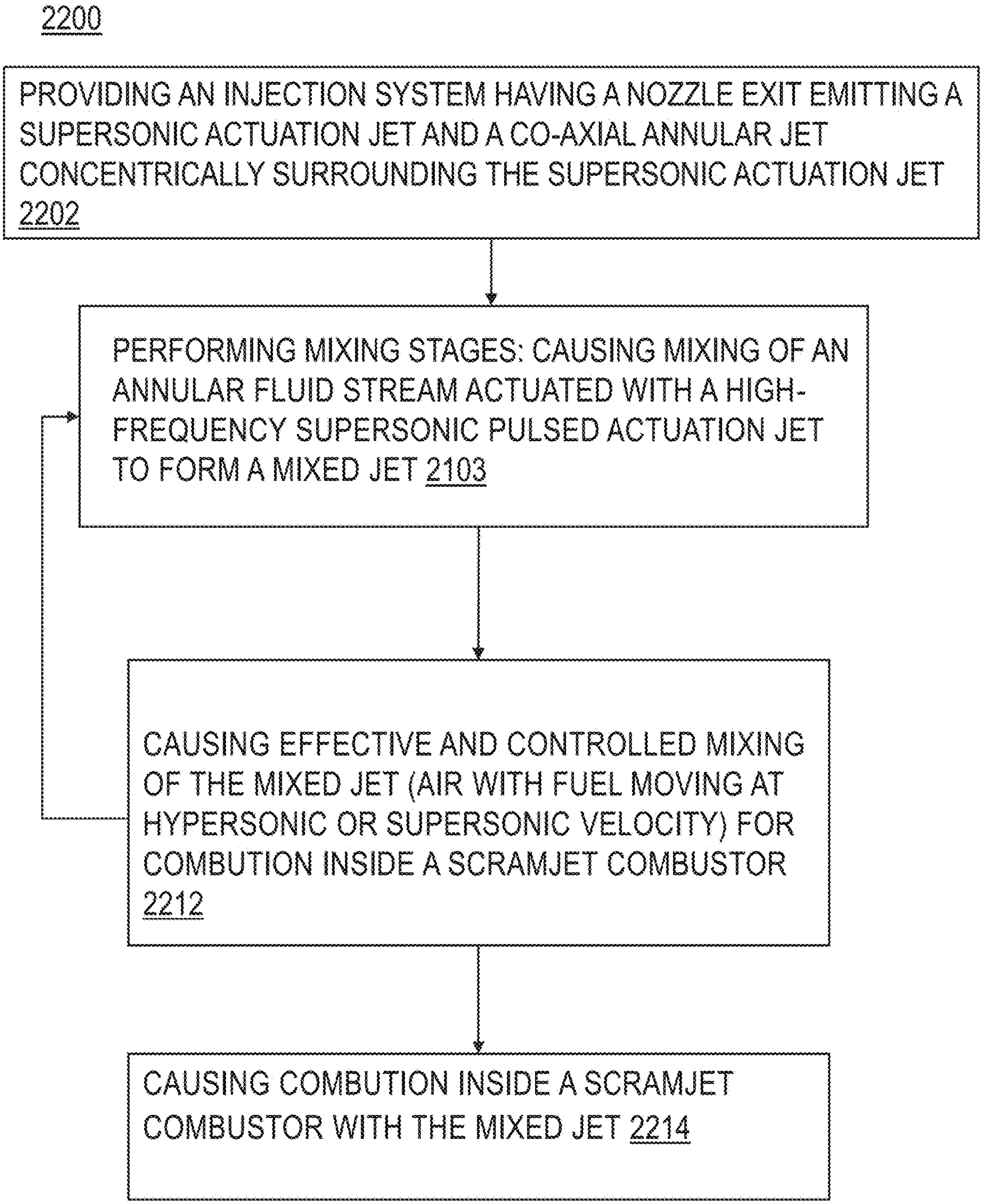
FIG. 22 illustrates a flow chart of a method for flow mixing of a high-frequency, supersonic pulsed actuation air jet with a secondary fluid stream using vortex and shock induced mixing for combustion in a scramjet combustor.
Figure 23:
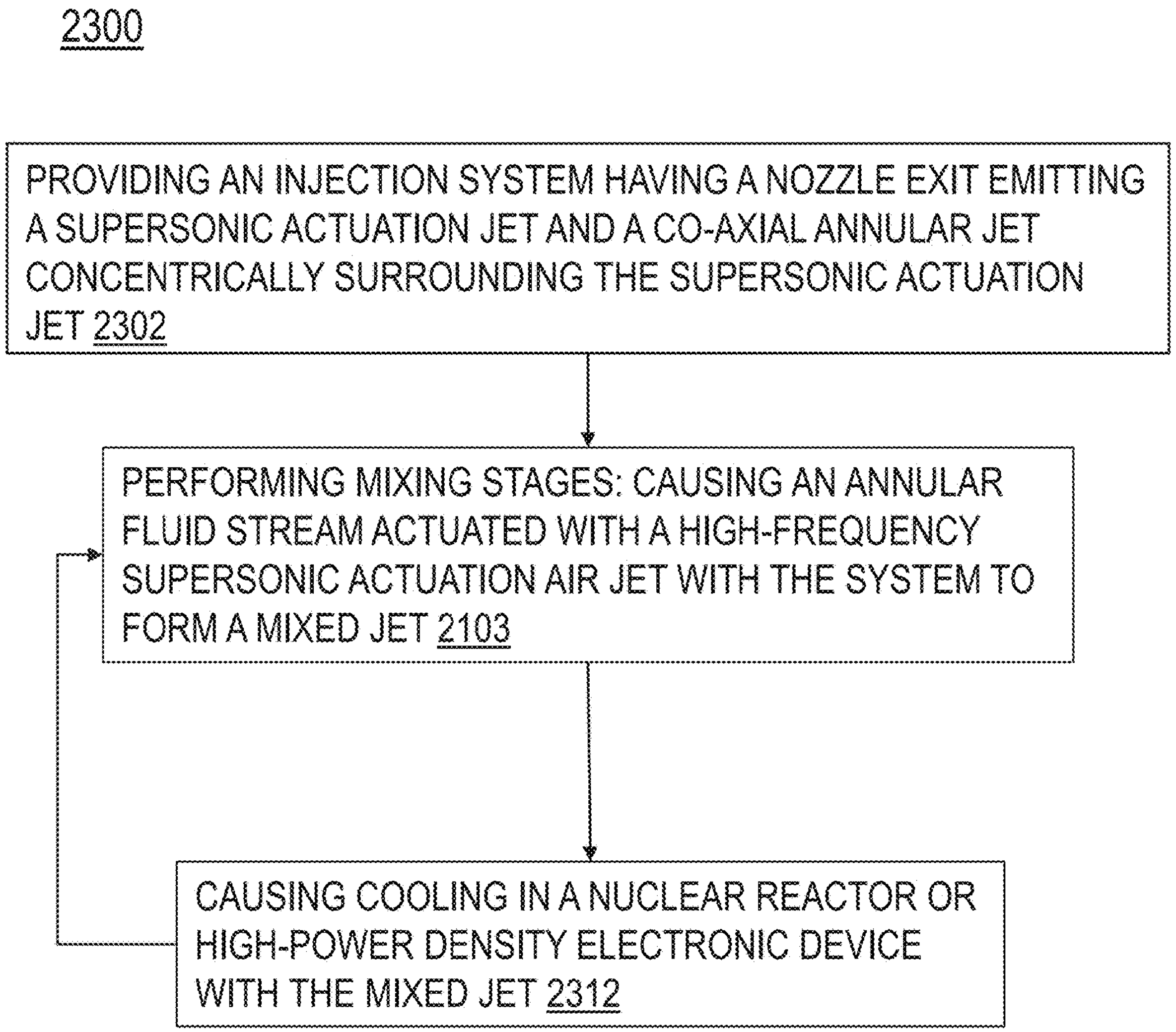
FIG. 23 illustrates a flow chart of a method for flow mixing of a high-frequency, supersonic pulsed actuation air jet with a secondary fluid stream using vortex and shock induced mixing for cooling in a nuclear reactor or high-power density electronic device.
Figure 24:
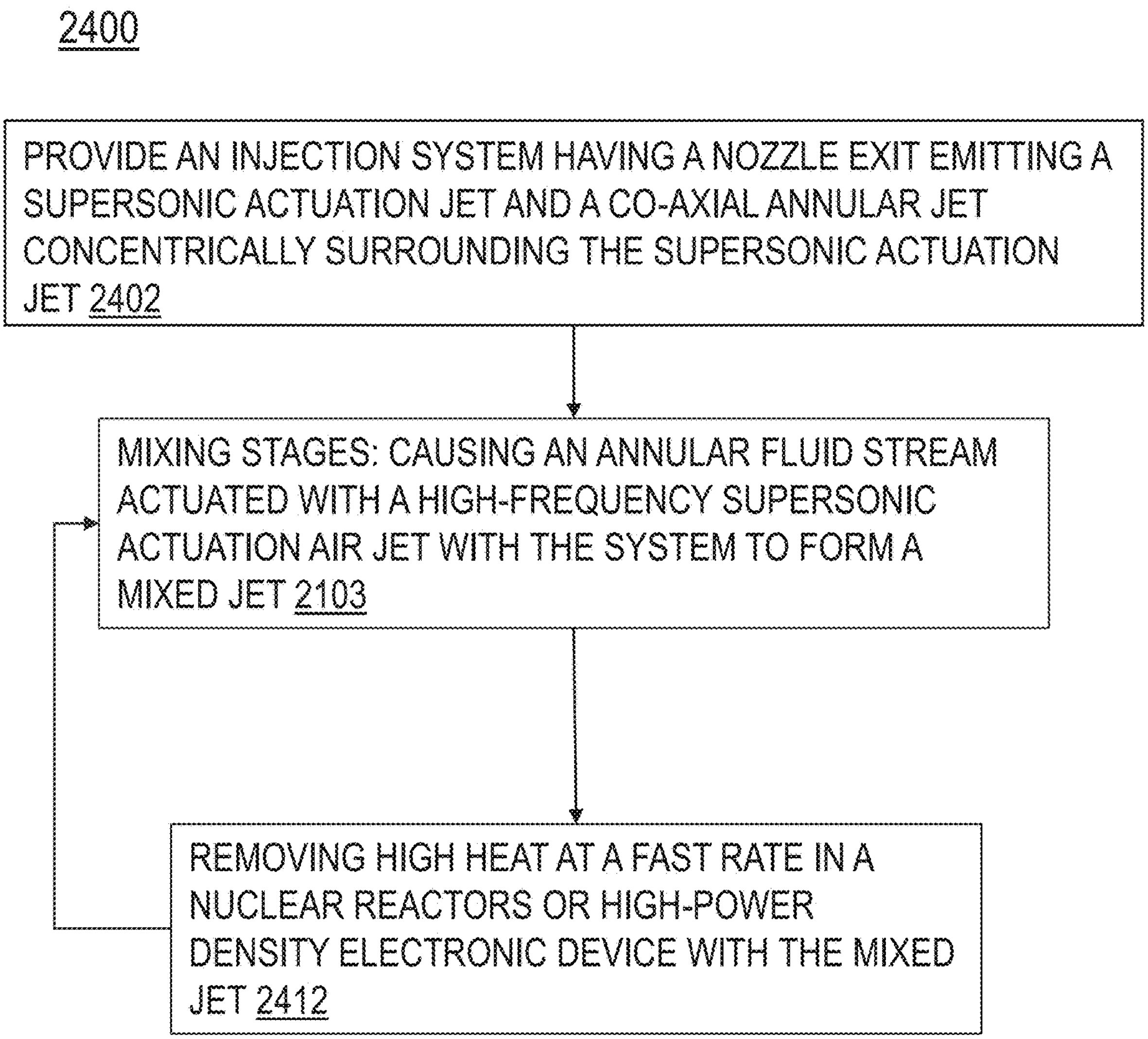
FIG. 24 illustrates a flow chart of a method for flow mixing of a high-frequency, supersonic pulsed actuation air jet with a secondary fluid stream using vortex and shock induced mixing for removing high heat at a faster rate.
Figure 26B:
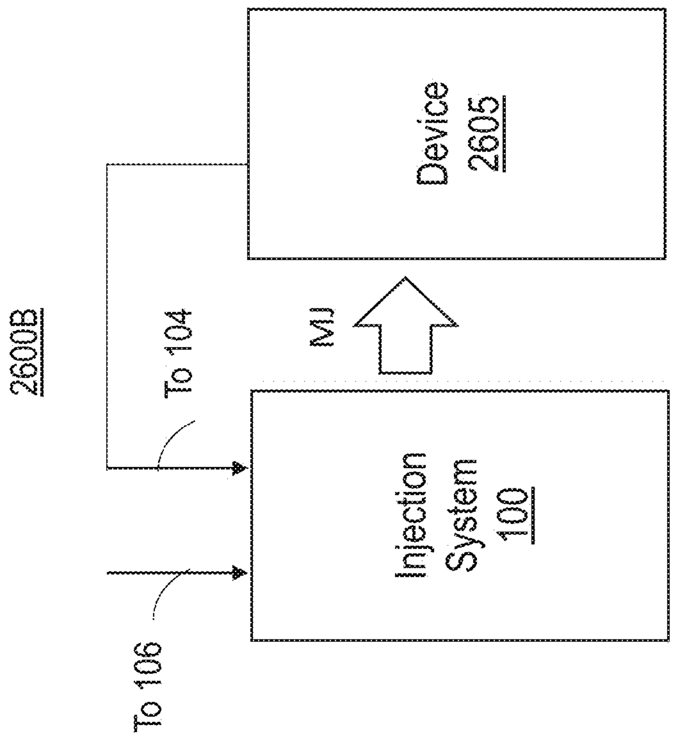
FIG. 26B illustrates a block diagram of system for cooling or heating a feed from a hot or cold device.
Figure 26A:
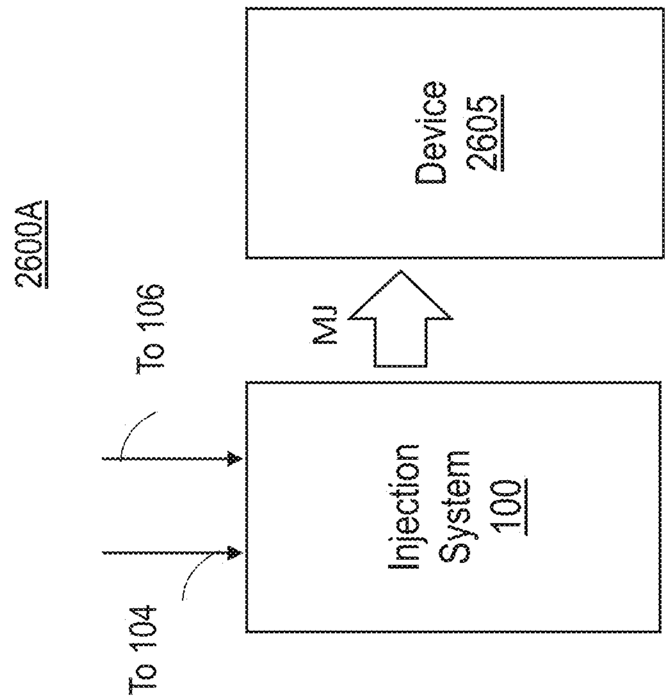
FIG. 26A illustrates a block diagram of system for cooling or heating a hot or cold device.

FIGS. 22-24 illustrate flow charts of various methods as will be described in more detail below. The methods of FIGS. 22-24 will be described in relation to FIGS. 26A and 26B. FIG. 26A illustrates a block diagram of system 2600A for cooling or heating a hot or cold device 2605. FIG. 26B illustrates a block diagram of system 2600B for cooling or heating a hot or cold device 2605.

FIG. 22 illustrates a flow chart of a method 2200 for flow mixing of a high-frequency, supersonic pulsed actuation air jet with a secondary fluid stream using vortex and shock induced mixing for combustion in a scramjet combustor. The method 2200 may include providing an injection system 100 of FIG. 1A, 26A or 26B, for example, having a nozzle exit emitting a supersonic actuation jet pulsing at a frequency in the frequency range 10-20 kHz and a co-axial annular jet concentrically surrounding the supersonic actuation jet, wherein the supersonic actuation jet is air and the annular jet stream is a fuel. The air is sent to inlet 104. The fuel is sent to inlet 106. The method 2200 may include, at block 2103, performing mixing stages. The block 2103 was previously described in relation to FIG. 21. Performing the mixing stages effectuates causing mixing of a co-axial annular fluid stream actuated with a high-frequency, supersonic pulsed actuation jet to form a mixed jet (MJ), at block 2103.

The method 2200 may include, at block 2212, causing effective and controlled mixing of the mixed jet (air-fuel mixture) with an air stream moving at hypersonic or supersonic velocity for combustion inside a scramjet combustor (i.e., device 2605 of FIG. 26A). At block 2214, the method 2200, causing effective combustion inside a scramjet combustor with the mixed jet (MJ).

The embodiments herein provide an active, pulsed co-axial jet injection assembly integrated with ultra-high frequency pulsed micro-actuators. The assembly steadily injects a fluid through an annular space around a 1 mm nozzle through which supersonic actuation air-jet flows out at a frequency range of 11-20 kHz. The pulsed air jet develops a high-frequency compressible air vortex in the injected flow field and entrainment of the jet injected through the annular space, causing significantly improved mixing between the two fast-moving fluids.

The pulsed co-axial flow field is analyzed using phase-locked micro-Schlieren imaging and the planar laser-induced fluorescence (PLIF) technique. PLIF uses saturated acetone introduced to the annular jet for quantitative mixing measurements. The experimental data shows that pulsed injection enhances mixing due to vortex entrainment, shock blasting through the fluid stream, vortex growth, and natural diffusion through the inner and outer shear layers of the flow compared to a configuration with steady actuation. The estimate shows that the compressible pulsed vortex generated by the actuation jet has an initial velocity of 216 msec and an average velocity of 156 msec in its first cycle close to the exit. The vortex velocity drops 65 msec after 64 microseconds.

The PLIF image analysis estimates that pulsed injection significantly improved mixing by 50-115% compared to steady co-axial injection under the same injection pressure conditions. The data indicate that the actuation jet's unsteadiness amplitude and frequency strongly influence the high-speed mixing phenomena.

In view of the foregoing, the system 100, described as using nitrogen and $CO_2$, demonstrated a method for effective mixing and control of fast-moving air and a fuel in scramjet engines. However, the nozzle assembly 126 has applications for rapid cooling or rapid heating using the high frequency vortex rich co-axial fluid stream being sent to a secondary apparatus. Alternately, a jet or fluid stream may come from a secondary apparatus, which needs to be rapidly cooled or heated. This can be accomplished using the nozzle assembly 126. For example, the nitrogen feed or the $CO_2$ can be replaced with the fluid stream from the secondary apparatus. The other jet or fluid streams may be replaced with a coolant, for example.

The nozzle assembly 126 has other applications including cooling a secondary apparatus using the vortex rich co-axial mixed fluid streams. In this scenario, the nozzle assembly 126 output produces a coolant that is sent to the secondary apparatus for cooling. Alternately, if the secondary apparatus needs to be heated, the nozzle assembly 126 produces a heating fluid that is sent to the secondary apparatus.

By way of non-limiting example, the nozzle assembly 126 may find applications in high-speed temperature management of a nuclear reactor, a gas turbine, or high-power density electronic devices or for similar applications for cooling or heating management.

FIG. 23 illustrates a flow chart of a method 2300 for flow mixing of a high-frequency, supersonic pulsed actuation air jet with a secondary fluid stream using vortex and shock induced mixing for cooling in a nuclear reactor, high-power density electronic device, or gas turbines (i.e., device 2605 of FIG. 26A or 26B) or for similar applications. The method 2300 may include providing an injection system of FIG. 1A, for example, having a nozzle exit emitting a supersonic actuation jet pulsing at a frequency in the frequency range 10-20 kHz and a co-axial annular jet concentrically surrounding the supersonic actuation jet. The method 2300 may include, at block 2103, performing mixing stages. The block 2103 was previously described in relation to FIG. 21. Performing the mixing stages effectuates causing mixing of a co-axial annular fluid stream actuated with a high-frequency, supersonic pulsed actuation jet to form a mixed jet (MJ), at block 2103. The method 2300 may include, at block 2312, causing cooling one of the supersonic actuation jet and the co-axial annular jet in response to the mixing to cool a nuclear reactor or high-power density electronic device (i.e., device 2605) with the mixed jet (MJ). By way of non-limiting example, nitrogen (i.e., the actuation jet) may be very cold and/or may be further chilled to sub-zero degrees. Other gases or chemical composition may be used. The formation of the mixed jet (MJ) causes the co-axial annular jet at a higher temperature than the actuation jet to be cooled by the colder actuation jet. The mixed jet sent to the device 2605 may be cold to cool the device 2605.

Alternately, the co-axial annular jet may be colder than the actuation jet. The formation of the mixed jet (MJ) causes the actuation jet at a higher temperature than the co-axial annular jet to be cooled by the colder jet.

FIG. 24 illustrates a flow chart of a method 2400 for flow mixing of a high-frequency, supersonic pulsed actuation air jet with a secondary fluid stream using vortex and shock induced mixing for removing high heat at a faster rate. The method 2400 may include providing an injection system of FIG. 1A, 26A or 26B, for example, having a nozzle exit emitting a supersonic actuation jet pulsing at a frequency in the frequency range 10-20 kHz and a co-axial annular jet concentrically surrounding the supersonic actuation jet. The method 2400 may include, at block 2103, performing mixing stages. The block 2103 was previously described in relation to FIG. 21. Performing the mixing stages effectuates causing mixing of a co-axial annular fluid stream actuated with a high-frequency, supersonic pulsed actuation jet to form a mixed jet (MJ), at block 2103. The method 2400 may include, at block 2412, removing heat at a fast rate using the supersonic actuation jet and the co-axial annular jet in response to the mixing to remove heat in the nuclear reactor or high-power density electronic device with the mixed jet (MJ). As shown in FIG. 26B, one of the supersonic actuation jet and the co-axial annular jet may be from device 2605 and feed into the injection system 100 so that the mixed jet removes heat from the feed. The system 2600B may return the mixed jet to the device 2605.

Figure 25:
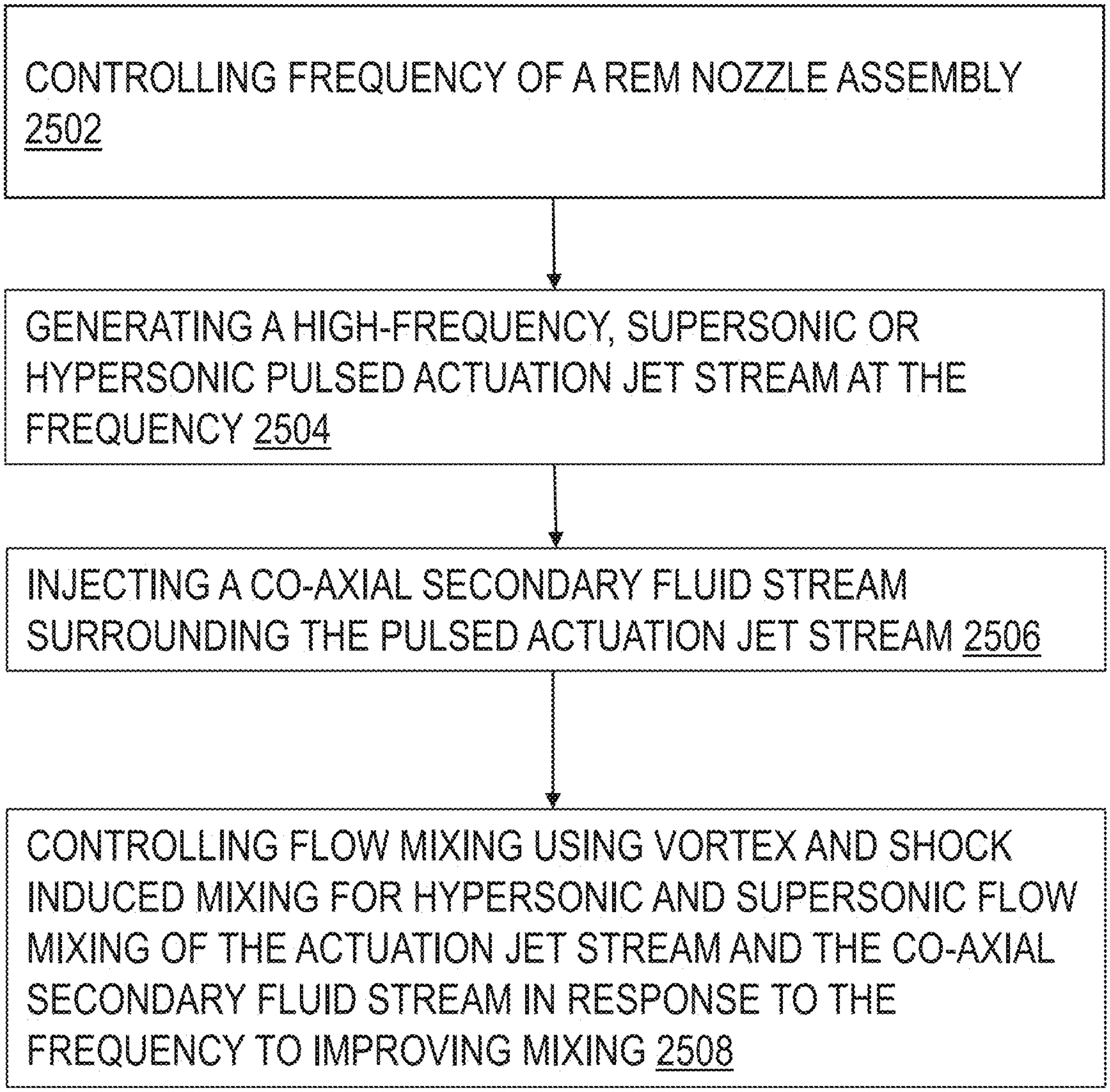
FIG. 25 illustrates a flow chart of a method for controlling flow mixing of a high-frequency, supersonic pulsed actuation air jet with a secondary fluid stream using vortex and shock induced mixing.

FIG. 25 illustrates a flow chart of a method 2500 for controlling flow mixing of a high-frequency, supersonic pulsed actuation air jet with a secondary fluid stream using vortex and shock induced mixing. The method 2500 may include, at block 2502, controlling a frequency of a REM nozzle assembly. This controls the frequency of the generated pulsing or amplitude of pulsing of an actuation jet. The frequency of the REM nozzle assembly may be a function of one or more parameters including geometric parameters (i.e., volume) of the REM nozzle assembly, injection pressure, and steady source jet mass flow rate so that by changing the one or more of the parameters the actuation jet can be operated in steady mode without pulsation or at a selected frequency in a frequency range of 10 kHz to 20 kHz.

The method 2500 may include, at block 2504, generating, by the REM nozzle assembly, a high-frequency, supersonic or hypersonic pulsed actuation jet stream at the frequency 10-20 kHz. The method 2500 may include, at block 2506, injecting a co-axial (annular) secondary fluid stream surrounding the pulsed actuation jet stream. The method 2500 may include, at block 2508, controlling flow mixing using vortex and shock induced mixing for hypersonic and supersonic flow mixing of the actuation jet stream and the co-axial secondary fluid stream, in response to the frequency. The controlled flow mixing can be used to improve mixing by 50-115% compared to a steady co-axial injection under the same injection pressure conditions.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

REFERENCES

The following References are incorporated herein by reference in their entirety.

1. B. Ritchie, D. Mujumdar, and J. Seitzman, "Mixing in co-axial jets using synthetic jet actuators," AIAA-2000-04-04.
2. Davis, S. A. & Gezer, A., "Mixing Control of Fuel Jets Using Synthetic Jet Technology: Velocity Field Measurements," AIAA Paper 99-0447.
3. Broadwell, J. E. and Mungal, M. G., "Large Scale Structures and Molecular Mixing," Physics Fluids, 1193-1206, 1991.
4. Kraus, D. K., and Cutler, A. D., "Mixing of Swirling Jets in a Supersonic Duct Flow," Journal of Propulsion and Power, Vol. 12, No. 1, 1995, pp. 170-177. doi:10.2514/3.24007.
5. Cutler, A. D., and Doerner, S. E., "Effects of Swirl and Skew upon Supersonic Wall Jet in Crossflow," Journal of Propulsion and Power, Vol. 17, No. 6, 2001, pp. 1327-1332. doi:10.2514/2.5882.
6. Drozda, T. G., Baurle, R. A., and Drummond, J. P., "Impact of Flight Enthalpy, Fuel Stimulant, and Chemical Reactions on the Mixing Characteristics of Several Injectors at Hypervelocity Flow Conditions," NASA Langley Research Center, May 2016, https://ntrs.nasa.gov/archive/nasa/casi.ntrs.nasa.gov/20160009131.pdf [retrieved May 2017].
7. Gruber, M. R., Nejad, A. S., Chen, T. H., and Dutton, J. C., "Transverse Injection from Circular and Elliptic Nozzles into a Supersonic Crossflow," Journal of Propulsion and Power, Vol. 16, No. 3, 2000, pp. 449-457. doi:10.2514/2.5609.
8. VanLerberghe, W. M., Santiago, J. G., Dutton, J. C., and Lucht, R. P., "Mixing of a Sonic Transverse Jet Injected into a Supersonic Flow," AIAA Journal, Vol. 38, No. 3, 2000, pp. 470-479. doi:10.2514/2.984.
9. Shigeru, A., ArifNur, H., Shingo, M., Kei, I., and Yasuhiro, T., "Fundamental Study of Supersonic Combustion in Pure Air Flow with Use of Shock Tunnel," Acta Astronautica, Vol. 57, Nos. 2-8, 2005, pp. 384-389. doi: 10.1016/j.actaastro.2005.03.055.
10. Menon, S., "Shock Wave Induced Mixing Enhancement in Scramjet Combustors," AIAA Paper 1989-0104, 1989. doi:10.2514/6.1989-104.
11. Ben-Yakar, B., Mungal, M. G., and Hanson, R. K., "Time Evolution and Mixing Characteristics of Hydrogen and Ethylene Supersonic Crossflow," Physics of Fluids, Vol. 18, No. 2, 2006, Paper 026101. doi:10.1063/1.2139684.
12. Hsu, K., Carter, C. D., Gruber, M. R., and Tam, C., "Mixing Study of Strut Injectors in Supersonic Flows," AIAA Joint Propulsion Conference, AIAA Paper 2009-5226, 2009. doi:10.2514/6.2009-5226.
13. Hongbin, G., Zhi, L., Fei, L., Lihong, C., Shenglong, G., and Xinyu, C., "Characteristics of Supersonic Combustion with Hartmann-Sprenger Tube Aided Fuel Injection," AIAA Conference, AIAA Paper 2011-2326, 2011. doi: 10.2514/6.2011-2326.
14. Solomon, J. T., Cairnes, K., Nayak, C., Jones, M. and Alexander, D. Design and Characterization of Nozzle Injection Assemblies Integrated High-frequency Micro-actuators. AIAA Journal Vol. 56, No. 9, pp. 3436-3448, 2018.
15. Ali M Y, Arora N, Topolski M, Alvi F S, and Solomon J T. Properties of Resonance Enhanced Microjets in Supersonic Crossflow" AIAA Journal, AIAA Journal, Vol. 55, No. 3, pp. 1075-1081. https://doi.org/10.2514/11055082, 2017.
16. Uzun, A., Solomon, J. T., Foster, C. H., Oates, W. S., Hussaini, M. Y., Alvi, F. S. Flow physics of a pulsed microjet actuator for high-speed flow control. AIAA Journal Volume 51, No. 12, pp 2894-2918, 2013.
17. Solomon, J. T., Foster, C., Alvi F. S. Design, and characterization of High-Bandwidth, Resonance Enhanced, Pulsed Microactuators: A parametric study. AIAA Journal, Volume 51, No. 2, pp 386-396, 2013.
18. Solomon, J. T., Kumar, R., and Alvi, F. S. High-Bandwidth Pulsed Microactuators for High-Speed Flow Control," AIAA Journal, Vol. 48, No. 10, pp. 2386-2396. doi.org/10.2514/1.J050405, 2010.
19. Solomon, J, T. High-bandwidth Unsteady Actuators for Active Control of High-Speed Flows," Ph.D. Dissertation, Florida State University. http://purl.flvc.org/fsu/fd/FSU_migr_etd-1642, 2010.
20. Lozano, A., Smith, S. H., Mungal, M. G. and Hanson, R. K., "Concentration Measurements in a Transverse Jet by Planar Laser-Induced Fluorescence of Acetone" AIAA Journal 32, 218-221, (1994).
21. Lozano, A., Yip, B., and Hanson, R. K., "Acetone: a by planar laser-induced fluorescence," Experiments in Fluids 13, 369-376, (1992).

What is claimed is:

1. An injection system, comprising:
- a Resonance Enhanced Microjet (REM) nozzle assembly, comprising:
  - a plurality of plates including a top plate and a bottom plate,
- a first inlet formed in the top plate and coupled to a steady jet from a source nozzle,
- the bottom plate including a hollow cavity having a bottom surface,
  - a tube fixedly coupled within the bottom plate and within the hollow cavity to form a first outlet flush with an exit side of the bottom plate that exits a supersonic pulsed actuation jet, the first inlet and the first outlet being fluid coupled together,
  - a second outlet in the bottom plate and positioned concentric about the tube to form a circular slit around the tube, the circular slit being directly fluidly coupled to the bottom surface of the hollow cavity to produce a co-axial annular jet, and
  - a second inlet via a conduit coupled to a secondary fluid stream source and the hollow cavity;
  - wherein the first outlet and the circular slit are constructed and arranged to effectuate a plurality of different mixing mechanisms between the co-axial annular jet emitted from the circular slit and the supersonic pulsed actuation jet emitted from the first outlet.

2. The injection system according to claim 1, wherein:
- the second outlet has an inner diameter of 1.96 millimeters (mm);
- the tube has an inner diameter of 1 mm and an outer diameter of 1.5 mm; and
- the circular slit has a thickness of 0.230 mm between an outer surface of the tube and an inner surface of the second outlet.

3. The injection system according to claim 1, wherein the REM nozzle assembly has a frequency that has an inverse correlation to a volume of the REM nozzle assembly, the frequency is a function of one or more parameters including geometric parameters of the REM nozzle assembly, injection pressure and steady source jet mass flow rate so that by changing some of the parameters the actuation jet can be operated in steady mode without pulsation.

4. The injection system according to claim 3, wherein the volume is 20.6 $mm^3$.

5. The injection system according to claim 1, wherein the supersonic pulsed actuation jet includes:
- an evolving vortex;
- a moving shockwave; and
- a wavefront, which impacts a mixing process between the supersonic pulsed actuation jet and the co-axial annular jet from the circular slit.

6. The injection system according to claim 5, wherein the co-axial annular jet:
- has a core;
- surrounds the supersonic pulsed actuation jet within the core;
- is entrained into the evolving vortex of the supersonic pulsed actuation jet; and
- diffuses into the supersonic pulsed actuation jet as the co-axial annular jet moves downstream.

7. The injection system according to claim 6, wherein the vortex and the shockwave excite a shear layer of annular flow of the co-axial annular jet, causing enhanced mixing between the co-axial annular jet and the supersonic pulsed actuation jet.

8. The injection system according to claim 1, wherein the plurality of different mixing mechanisms includes:
- a first mixing mechanism of the co-axial annular jet and the supersonic pulsed actuation jet due to vortex-induced mixing of the co-axial annular jet and the supersonic pulsed actuation jet;
- a second mixing mechanism of the co-axial annular jet and the supersonic pulsed actuation jet due to shock-wave-induced mixing between the co-axial annular jet and the supersonic pulsed actuation jet;
- a third mixing mechanism of the co-axial annular jet and the supersonic pulsed actuation jet, which is due to growth and entrainment of a vortex downstream; and
- a fourth mixing mechanism of the co-axial annular jet and the supersonic pulsed actuation jet, which is from natural diffusion from inner and outer shear layers of the co-axial annular jet.

9. The injection system according to claim 8, wherein:
- the first outlet and the circular slit form a nozzle exit;
- the supersonic pulsed actuation jet creates a compressible vortex formed near proximate to the nozzle exit; and the compressible vortex entrains the co-axial annular jet at the nozzle exit and moves forward with a velocity of 200+ meters/second.

10. The injection system according to claim 8, wherein:
the shockwave-induced mixing is caused by a pulsing action that produces a shockwave that moves faster than a jet front, causing a breakdown of the shear layer;
the pulsing action creates fragmented structures of the co-axial annular jet surrounded by the supersonic pulsed actuation jet; and
the moving shockwave drags some of these fragmented structures in a forward motion, creating a plume of disintegrated co-axial annular jet surrounded by the actuation jet.

11. The injection system according to claim 10, wherein:
the fourth mixing mechanism is the natural diffusion to ambiance from the inner and outer shear layers of moving vortexes and that of the co-axial annular jet and the supersonic pulsed actuation jet.

12. A method, comprising:
providing the injection system according to claim 1, having a nozzle exit emitting a supersonic pulsed actuation jet pulsing in the frequency range 10-20 kHz and a co-axial annular jet concentrically surrounding the supersonic pulsed actuation jet;
causing a first mixing of the co-axial annular jet and the supersonic pulsed actuation jet, due to vortex-induced mixing;
causing a second mixing, of the co-axial annular jet and the supersonic pulsed actuation jet due to shockwave-induced mixing;
causing a third mixing of the co-axial annular jet and the supersonic pulsed actuation jet, which is due to growth and entrainment of a vortex downstream; and
causing a fourth mixing of the co-axial annular jet and the supersonic pulsed actuation jet, which is from natural diffusion from inner and outer shear layers of the co-axial annular jet.

13. The method according to claim 12, wherein the the vortex-induced mixing includes:
creating a compressible vortex proximate to the nozzle exit; and
entraining, by the compressible vortex, the co-axial annular jet at the nozzle exit and moving forward with a velocity of 200+ meters/second.

14. The method according to claim 13, wherein:
during the shockwave-induced mixing, causing by a pulsing action to produce a shockwave that moves faster than a jet front, causing a breakdown of the shear layer;
the pulsing action creates fragmented structures of the co-axial annular jet surrounded by the supersonic pulsed actuation jet; and
the moving shockwave drags some of these fragmented structures in a forward motion, creating a plume of disintegrated co-axial annular jet surrounded by the actuation jet.

15. The method according to claim 14, wherein:
the fourth mixing is the natural diffusion to ambiance from the outer shear layer and an inner shear layer of moving vortexes and that of the co-axial annular jet and the supersonic pulsed actuation jet.

16. The method according to claim 14, wherein the nozzle exit comprises:
a tube having an inner diameter of 1 millimeter (mm) and an outer diameter of 1.5 mm and forming a first outlet;
a second outlet having an inner diameter of 1.96 mm; and
a circular slit having a thickness of 0.230 mm between an outer surface of the tube and an inner surface of the second outlet.

17. The method according to claim 12, wherein mixing operation performed by the first, second, third and fourth mixing is improved by 50-115% compared to a steady co-axial injection under the same injection pressure conditions.

18. A method comprising:
providing an injection system according to claim 1, having a nozzle exit emitting a supersonic pulsed actuation jet pulsing at a controlled frequency in the frequency range 10-20 kHz and a co-axial annular jet concentrically surrounding the supersonic pulsed actuation jet;
changing the frequency of pulsing or amplitude of pulsing of the supersonic pulsed actuation jet; and
controlling mixing of the co-axial jet and the supersonic pulsed actuation jet, in response to changing the frequency.

19. The method according to claim 18, wherein the high-speed mixing is improved in a range of 50-115% by changing at least one of the frequency of pulsing and the amplitude of pulsing.

20. A method comprising:
providing an injection system according to claim 1, having a nozzle exit emitting a supersonic pulsed actuation jet pulsing at a frequency in the frequency range 10-20 kHz and a co-axial annular jet concentrically surrounding the supersonic pulsed actuation jet, wherein the supersonic pulsed actuation jet is air and the annular stream is a fuel; and
mixing the air and the co-axial annular jet stream of the fuel in flow conditions such as experienced for combustion in a scramjet combustor.

21. A method comprising:
providing an injection system according to claim 1, having a nozzle exit emitting a supersonic pulsed actuation jet pulsing at a frequency in the frequency range 10-20 kHz and a co-axial annular jet concentrically surrounding the supersonic pulsed actuation jet;
mixing the supersonic pulsed actuation jet and the co-axial annular jet; and
removing heat using the supersonic pulsed actuation jet and the co-axial annular jet in response to the mixing to remove heat from a nuclear reactor, high-density-electronic device, or a gas turbine.

22. A method comprising:
providing an injection system according to claim 1, having a nozzle exit emitting a supersonic pulsed actuation jet pulsing at a frequency in the frequency range 10-20 kHz and a co-axial annular jet concentrically surrounding the supersonic pulsed actuation jet;
mixing of the supersonic pulsed actuation jet and the co-axial annular jet; and
cooling using the supersonic pulsed actuation jet and the co-axial annular jet in response to the mixing to cool a nuclear reactor, electronic device, or a gas turbine.

* * * * *